United States Patent
Onoda et al.

(10) Patent No.: US 7,534,834 B2
(45) Date of Patent: May 19, 2009

(54) COMPOSITION FOR PRODUCING GOLF BALLS AND MULTI-PIECE GOLF BALLS

(75) Inventors: Kenji Onoda, Kashihara (JP); Masao Ogawa, Osaka (JP); Yuri Naka, Katano (JP); Norikazu Ninomiya, Osaka (JP)

(73) Assignee: Mizuno Corporation, Osaka-shi (JP)

(*) Notice: Subject to any disclaimer, the term of this patent is extended or adjusted under 35 U.S.C. 154(b) by 191 days.

(21) Appl. No.: 10/963,518

(22) Filed: Oct. 14, 2004

(65) Prior Publication Data

US 2005/0277488 A1 Dec. 15, 2005

(30) Foreign Application Priority Data

Jun. 9, 2004 (JP) .............................. 2004-171120

(51) Int. Cl.
*A63B 37/12* (2006.01)
*A63B 37/00* (2006.01)
*C08L 75/00* (2006.01)
*C08L 9/00* (2006.01)
*C08L 33/02* (2006.01)

(52) U.S. Cl. .................. 525/128; 525/127; 525/130; 525/457; 525/458; 473/373; 473/374; 473/377; 473/378; 473/385

(58) Field of Classification Search .................. None
See application file for complete search history.

(56) References Cited

U.S. PATENT DOCUMENTS

| | | | |
|---|---|---|---|
| 5,571,623 A | 11/1996 | Kuriyama et al. | ........... 428/403 |
| 5,961,401 A | 10/1999 | Masutani et al. | ............ 473/374 |
| 2003/0045652 A1 | 3/2003 | Takesue et al. | .............. 525/424 |
| 2003/0114253 A1 | 6/2003 | Hayashi et al. | ............. 473/376 |
| 2004/0106471 A1* | 6/2004 | Hayashi et al. | ............. 473/371 |

FOREIGN PATENT DOCUMENTS

| | | |
|---|---|---|
| JP | 49-136364 | 11/1974 |
| JP | 04-185648 | 7/1992 |
| JP | 07-097426 | 4/1995 |
| JP | 2003-024472 | 1/2003 |
| JP | 2003-049028 | 2/2003 |
| JP | 2003342549 | * 12/2003 |

* cited by examiner

*Primary Examiner*—David Buttner
(74) *Attorney, Agent, or Firm*—Kratz, Quintos & Hanson, LLP

(57) ABSTRACT

This invention is directed to A composition for forming a golf ball, the composition comprising polyurethane gel composite particles and at least one base material selected from the group consisting of synthetic resins and elastomers, the polyurethane gel composite particles consisting of colloidal polyurea particles precipitated from a non-aqueous solvent solution of colloidal polyurea and polyurethane gel particles covered with the polyurea particles, the polyurethane gel particles being three-dimensionally crosslinked and each of the polyurethane gel particles being formed of a polyisocyanate compound and a polyethylene oxide group-free, active-hydrogen-containing compound, at least one of the compounds being trifunctional or higher valency, and is also directed to a multi-piece golf ball having one or more layers formed of this composition.

7 Claims, 3 Drawing Sheets

(A)

(B)

COMPOSITION FOR PRODUCING GOLF BALLS AND MULTI-PIECE GOLF BALLS

BACKGROUND OF THE INVENTION

1. Field of the Invention

The present invention relates to compositions for forming golf balls and to multi-piece golf balls.

2. Description of the Related Art

In the prior art, ionomer resins have been regarded as a standard among materials for the cover of multi-piece golf balls. A golf ball having a cover formed of an ionomer resin exhibits a long carry distance and high durability, however such a golf ball gives a hard feel when hit, and tends to show poor control ability because of the quick ball release when hit.

In recent years, soft covers made of polyurethane resin or the like have been frequently employed to provide a soft feel when hit and to improve the control ability.

The properties required in golf balls include, in combination, a soft feel and good control ability as well as a long carry distance. When soft materials are used for the cover of a golf ball, a soft feel is gained but a long carry distance is not to be expected. On the other hand, when a hard material is used for the cover, a long carry distance is achievable, but a soft feel can not be obtained. It is difficult to realize a golf ball which satisfies all these conflicting properties.

Concerning techniques for achieving such an object, Japanese Unexamined Patent Publication No. 2003-49028 (claim 1, Paragraph 0008 and elsewhere) discloses the formation of a cover of a multi-piece golf ball using a composition containing an organic or inorganic basic compound as a dispersant to be used while adding a polyurethane elastomer to an ionomer resin.

SUMMARY OF THE INVENTION

An object of the invention is to provide a multi-piece golf ball exhibiting both a soft feel and a long carry distance.

To achieve the foregoing object, the present inventors conducted extensive research and obtained the following novel findings.

(i) In a multi-piece golf ball, a layered cover is formed composed of an ionomer resin or polyurethane as a base material together with polyurethane gel composite particles whose surfaces are covered with colloidal polyurea particles, so that the golf ball is made to attain a long carry distance attributable to the properties of the ionomer resin and polyurethane, while a soft feel is exhibited when hit due to the polyurethane gel composite particles, whereby the golf ball has improved durability characteristics such as abrasion resistance. The obtained golf ball has an improved adhesion between the cover and the coating layer.

(ii) In a multi-piece golf ball having one or more intermediate layers, one or more intermediate layers in the ball include, as a base material, an ionomer resin, polyurethane or butadiene rubber, and polyurethane gel composite particles. A golf ball thus-formed can exhibit a long carry distance due to the properties of the ionomer resin, polyurethane or butadiene rubber, while the ball gives a soft feel when hit because of the polyurethane gel composite particles.

Further, when the layer in contact with the cover contains polyurethane gel composite particles, the adhesion between the cover and the intermediate layer is enhanced when polyurethane is present in the cover, so that the golf ball has improved durability and ball bounce resilience.

(iii) When the core of a multi-piece golf ball contains butadiene rubber as a base material together with polyurethane gel composite particles, the core is rendered made soft and a soft feel is achieved when hit. Further, when polyurethane is present in an outer layer (intermediate layer or cover), the adhesion between the core and the outer layer is enhanced, and the durability and ball bounce resilience are improved.

The present invention was completed based on the foregoing novel findings and provides the following multi-piece golf balls.

1. A composition for forming a golf ball, the composition comprising polyurethane gel composite particles and at least one base material selected from the group consisting of synthetic resins and elastomers, the polyurethane gel composite particles consisting of colloidal polyurea particles precipitated from a non-aqueous solvent solution of colloidal polyurea and polyurethane gel particles covered with the polyurea particles, the polyurethane gel particles being three-dimensionally crosslinked and each of the polyurethane gel particles being formed of a polyisocyanate compound and a polyethylene oxide group-free, active-hydrogen-containing compound, at least one of the compounds being trifunctional or higher valency.

2. The composition according to item 1, wherein the base material is an ionomer resin, polyurethane or butadiene rubber.

3. The composition according to item 1, wherein each of the colloidal polyurea particles composing the polyurethane gel composite particles comprises a solvated portion and a non-solvated portion, the non-solvated portion having a particle size of from 0.01 to 1 μm.

4. The composition according to item 3, wherein each of the colloidal polyurea particles composing the polyurethane gel composite particles are obtained by reacting an oil-modified polyol and a polyisocyanate and then reacting the resulting reaction product with a polyamine compound, each polyurea particles having a non-solvated portion which forms a hydrogen bonds with urea groups.

5. The composition according to item 4, wherein each of the colloidal polyurea particles composing the polyurethane gel composite particles has a non-solvated portion further formed by bonding at least one functional group selected from the group consisting of hydroxyl, carboxyl and mercapto groups.

6. The composition according to item 1, wherein the polyurethane gel composite particles have a particle size of 0.5 to 100 μm.

7. The composition according to item 1, wherein the base material is an ionomer resin.

8. The composition according to item 7, wherein the polyurethane gel composite particles are present in an amount of from 0.1 to 40 parts by weight per 100 parts by weight of the base material.

9. The composition according to item 1, wherein the base material is polyurethane.

10. The composition according to item 9, wherein the polyurethane gel composite particles are present in an amount of from 0.1 to 40 parts by weight per 100 parts by weight of the base material.

11. The composition according to item 1, wherein the base material is butadiene rubber.

12. The composition according to item 11, wherein the polyurethane gel composite particles are present in an amount of from 0.1 to 30 parts by weight per 100 parts by weight of the base material.

13. A multi-piece golf ball comprising a core, an intermediate layer formed of one or two sub-layers, and a cover, or comprising a core and a cover, wherein the cover is a layer formed of the composition of item 7.

14. The multi-piece golf ball according to item 13, wherein the base material for the core is butadiene rubber, and wherein the base material for the intermediate layer, if present, is butadiene rubber, polyurethane or ionomer resin.

15. A multi-piece golf ball comprising a core, an intermediate layer formed of one or two sub-layers, and a cover, or comprising a core and a cover, wherein the cover is a layer formed of the composition of item 9.

16. The multi-piece golf ball according to item 15, wherein the base material for the core is butadiene rubber, and wherein the base material for the intermediate layer, if present, is butadiene rubber, polyurethane or ionomer resin.

17. A multi-piece golf ball comprising a core, an intermediate layer comprising one or two sub-layers, and a cover, wherein at least one sub-layer of the intermediate layer is composed of the composition of item 7.

18. The multi-piece golf ball according to 17, wherein the base material for the core is butadiene rubber, the base material for the cover is an ionomer resin or polyurethane, and the intermediate layer comprises two sub-layers and when one of the sub-layers is formed of the composition of item 7, the base material of the other intermediate sub-layer is butadiene rubber, polyurethane or an ionomer resin.

19. A multi-piece golf ball comprising a core, an intermediate layer comprising one or two sub-layers, and a cover, wherein at least one sub-layer of the intermediate layer is composed of the composition of item 9.

20. The multi-piece golf ball according to 19, wherein the base material for the core is butadiene rubber, the base material for the cover is an ionomer resin or polyurethane, and the intermediate layer comprises two sub-layers and when one of the sub-layers is formed of the composition of item 9, the base material of the other intermediate sub-layer is butadiene rubber, polyurethane or an ionomer resin.

21. A multi-piece golf ball comprising a core, an intermediate layer comprising one or two sub-layers, and a cover, wherein at least one sub-layer of the intermediate layer is composed of the composition of item 11.

22. The multi-piece golf ball according to item 21, wherein the base material for the core is butadiene rubber, the base material for the cover is an ionomer resin or polyurethane, and the intermediate layer comprises two sub-layers and when one of the sub-layers is formed of the composition of item 11, the base material of the other intermediate sub-layer is butadiene rubber, polyurethane or an ionomer resin.

23. A multi-piece golf ball comprising a core, an intermediate layer formed of one or two sub-layers and a cover, or comprising a core and a cover, wherein the core is a layer formed of the composition of item 11.

24. The multi-piece golf ball according to item 23, wherein the base material for the intermediate layer, if present, is butadiene rubber, polyurethane or an ionomer resin, and wherein the base material for the cover is an ionomer resin or polyurethane.

25. The multi-piece golf ball according to item 13, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

26. The multi-piece golf ball according to item 15, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

27. The multi-piece golf ball according to item 17, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

28. The multi-piece golf ball according to item 19, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

29. The multi-piece golf ball according to item 21, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

30. The multi-piece golf ball according to item 23, wherein the ball comprises a core, an intermediate layer comprising a single layer, and a cover, wherein the core has a spherical main body and a plurality of ribs formed on the surface of the main body, thereby defining concave portions therebetween, and the intermediate layer is placed in the concave portions surrounded by the ribs.

31. The multi-piece golf ball according to item 13, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

32. The multi-piece golf ball according to item 15, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

33. The multi-piece golf ball according to item 17, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

34. The multi-piece golf ball according to item 19, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

35. The multi-piece golf ball according to item 21, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

36. The multi-piece golf ball according to item 23, wherein the ball comprises a core, a first intermediate layer, a second intermediate layer and a cover, wherein the first intermediate layer is a plurality of ribs formed on the core, thereby defining concave portions therebetween, and the second intermediate layer is placed in the concave portions surrounded by the ribs, and wherein the cover forms the outermost layer.

37. The multi-piece golf ball according to item 13, wherein the ball comprises a core and a cover formed thereon, wherein the core has grooves formed along three great circles encompassing the core so as to intersect each other at right angles, and wherein the cover has projections engageable with the grooves on the interior surface of the cover.

38. The multi-piece golf ball according to item 15, wherein the ball comprises a core and a cover formed thereon, wherein the core has grooves formed along three great circles encompassing the core so as to intersect each other at right angles, and wherein the cover has projections engageable with the grooves on the interior surface of the cover.

39. The multi-piece golf ball according to item 23, wherein the ball comprises a core and a cover formed thereon, wherein the core has grooves formed along three great circles encompassing the core so as to intersect each other at right angles, and wherein the cover has projections engageable with the grooves on the interior surface of the cover.

When the cover, intermediate layer and core in a multi-piece golf ball are formed using the composition of the invention, the multi-piece golf ball thus obtained can attain both a long carry distance and a soft feel when hit.

The incorporation of polyurethane gel composite particles improves the abrasion resistance and adhesion between adjacent layers and markedly enhances durability. That is, the occurrence of cracks, interlaminar separation and surface damage due to hitting are lessened.

When the cover contains polyurethane gel composite particles, the weight of the cover can be increased by increasing the specific gravity of polyurethane gel composite particles relative to a cover free of such polyurethane gel composite particles. As a result, the obtained golf ball is given a higher moment of inertia, and can be stably rotated.

When a golf ball with a hard cover formed from an ionomer resin is hit, a sharp metallic-like sound is produced, whereas a soft sound is produced if polyurethane gel composite particles are present in the ionomer cover. Golf players favor soft hitting sounds, and soft sounds serve also as a desirable anti-noise measure in golf-ball hitting practice grounds.

The multi-piece golf ball of the invention combines merits of both the base material and the polyurethane gel composite particles by a simple method, that is, merely by adding the polyurethane gel composite particles to the base material, instead of converting the base material to polymer alloy or copolymer of such polymers. Moreover, the properties of the golf ball, such as long carry distance and feeling when hit, can be easily adjusted by changing, e.g., the particle size, hardness, specific gravity, shape and amount of the polyurethane gel composite particles.

DETAILED DESCRIPTION OF THE INVENTION

Figure 1:
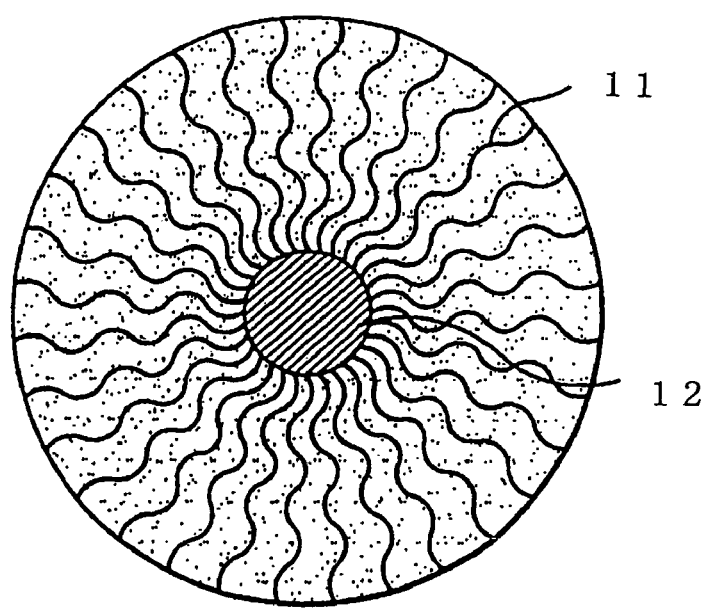
FIG. 1 shows the presumed structure of the polyurea particles.

The present invention is described below in more detail.

(I) Composition for Forming a Golf Ball

The composition for forming a golf ball according to the invention comprises polyurethane gel composite particles and a base material. Synthetic resins and elastomers useful as the base material for a golf ball can be used without limitation. Preferred compositions of the invention include a first composition containing an ionomer resin as the base material, a second composition containing polyurethane as the base material and a third composition containing butadiene rubber as the base material.

Polyurethane Gel Composite Particles

The polyurethane gel composite particles consist of colloidal polyurea particles precipitated from a non-aqueous solvent solution of colloidal polyurea and polyurethane gel particles covered with the polyurea particles, the polyurethane gel particles being three-dimensionally crosslinked and each of the polyurethane gel particles being formed of a polyisocyanate compound and a polyethylene oxide group-free, active-hydrogen-containing compound, at least one of the compounds being trifunctional or higher valency.

<Polyurethane Gel Particles>

The fine polyurethane gel particles are prepared by subjecting to emulsion polymerization a polyisocyanate compound and an active-hydrogen-containing compound in an inert liquid in the presence of colloidal polyurea particles as an emulsifier, at least one of the polyisocyanate compound and active-hydrogen-containing compound being trifunctional or higher valency.

The polyurethane gel particles to be used in the invention can be prepared by the above-mentioned general method. Specific preferred methods include those comprising charging an inert medium containing colloidal polyurea particles dispersed therein into a stirrer and emulsifier-equipped jacketed synthesis reactor, adding an inert medium solution containing a polyisocyanate compound and an active-hydrogen-containing compound, with at least one of the compounds being trifunctional or higher valency, and emulsifying the mixture to react the synthetic materials, giving fine polyurethane gel particles. Another method comprises emulsifying independently of each other, each of a polyisocyanate compound and an active-hydrogen-containing compound, at least one of the compounds being trifunctional or higher valency, and reacting them in the presence of colloidal polyurea particles in an inert medium.

The synthesis temperature is not limited, but is preferably in the range of about 40 to about 120° C. The colloidal polyurea particles are used in the reaction in an amount of 0.5 parts by weight or more, and preferably about 1 to about 20 parts by weight, per 100 parts by weight of each of the polyisocyanate compound and the active-hydrogen-containing compound, at least one of the compounds being trifunctional or higher valency. If the amount of colloidal polyurea particles is too small, the raw materials can not be satisfactorily emulsified and the polyurethane gel particles agglomerate into masses in the course of synthesis, making it difficult to obtain the contemplated fine polymer dispersion. On the other hand, if amount of the colloidal polyurea particles is excessive, no problems arise with the emulsifiability of polyurethane raw materials. Although a dispersion of polyurethane gel particles can be produced, the amount is excessive only in that it affords no advantage when acting as an emulsifier.

The lower the concentration of polyisocyanate compound and active-hydrogen-containing compound in the inert liquid, the smaller is likely to be the size of the particles. In view of productivity, a preferable concentration is about 20 to about 70 wt. %.

No particular limitation is imposed on the polyisocyanate compound to be used for synthesis of the polyurethane gel particles in the invention. Examples of such compounds are tolylene diisocyanate, 4,4'-diphenylmethane diisocyanate, xylene diisocyanate, m-xylene diisocyanate, 1,6-hexamethylene diisocyanate, lysine diisocyanate, 4,4'-methylenebis (cyclohexyl isocyanate), methylcyclohexane-2,4-(or -2,6-)-diisocyanate, 1,3-bis(isocyanate methyl)-cyclohexane, isophorone diisocyanate, trimethylhexamethylene diisocyanate and dimer acid diisocyanates having 2 isocyanate groups.

Also usable in the present invention are those obtained by converting these compounds into their isocyanurate forms, biuret forms, adduct forms and polymeric forms and containing polyfuctional isocyanate groups, for example, 4,4',4"-triphenylmethane triisocyanate, the cyclic trimer of 2,4-tolylene diisocyanate, the cyclic trimer of 2,6-tolylene diisocyanate, the cyclic trimers of mixed 2,4- and 2,6-tolylene diisocyanates, the cyclic trimer of diphenylmethane-4,4'-diisocyanate, the reaction product of 3 moles of diphenylmethane-4,4'-diisocyanate and 1 mole of trimethylolpropane, the reaction product of 3 moles of 2,4-tolylene diisocyanate and 1 mole of trimethylolpropane, the reaction product of 3 moles of 2,6-tolylene diisocyanate and 1 mole of trimethylolpropane, 3 moles of 2,4-tolylene diisocyanate and 1 mole of trimethylolethane, the reaction product of 3 moles of 2,6-tolylene diisocyanate and 1 mole of trimethylolethane, and the reaction product of 3 moles of mixed 2,4- and 2,6-tolylene diisocyanate and 1 mole of trimethylolpropane; and those obtained by subjecting compounds, which contain one active hydrogen in a molecule, such as methanol, ethanol, phenol, cresol, ε-caprolactam, methyl ethyl ketoxime, acetoxime, N,N-dimethylhydroxyamine, diethyl malonate and acetylacetone and some of or all the isocyanate groups of these polyisocyanate compounds to an addition reaction.

Examples of active-hydrogen-containing compounds useful in the invention are those that react with polyisocyanates, such as water, ethylene glycol, propylene glycol, 1,4-butanediol, 1,5-pentanediol, 1,6-hexanediol, octanediol, neopentyl glycol, glycerol, trimethylolpropane, hexanetriol, triethanolamine, pentaerythritol, ethylenediamine, propylenediamine, butylenediamine, 1,4-benzenethiol, sorbitol, polypropylene glycol, polyethylene glycol, polyethylene adipate, polybutylene adipate, polytetramethylene glycol, polyhexamethylene adipate, poly-ε-caprolactone, polyhexamethylene carbonate, hydrogenated dimer polyol, castor oil polyols, polyolefin polyols, polyethylene glycol, ethylene oxide-propylene oxide copolymer, ethylene oxide-bisphenol A copolymers, adducts of ethylene oxide and/or propylene oxide with tetrahydrofuran or glycerol. These may be used singly, in combination or as copolymers.

The kinds and amounts of polyisocyanate compound and active-hydrogen-containing compound to be used in the invention and the ratios thereof are determined depending on the purpose of the obtained polyurethane gel particles. However, at least one of the components must be in the form of a trifunctional or higher valency compound. For example, when the polyisocyanate compound is difunctional, the active-hydrogen-containing compound must be in the form of a trifunctional or higher valency compound. When the active-hydrogen-containing compound is difunctional, the polyisocyanate compound must be in the form of a trifunctional or higher valency compound. Alternatively, both can have trifuctionality or higher valency.

Although the NCO/OH ratio depends on the compounds used and properties required for the resulting product, the preferable ratio is usually about 0.5 to about 1.2.

The inert liquid, which is used for the reaction of both compounds and forms a continuous phase for the dispersion of polyurethane gel composite particles, is practically a non-solvent for the resulting polyurethane and contains no active hydrogen. Examples of such an inert liquid include pentane, hexane, heptane, octane, decane, petroleum ethers, petroleum benzine, ligroin, petroleum spirits, cyclohexane, methylcyclohexane, toluene, xylene and like hydrocarbons, and dimethyl polysiloxane, which are used singly or in combination. Among such inert liquids, those having a boiling point of 150° C. or less are preferred from the viewpoint of productivity of the separation step of the inert liquid from the particles synthesized.

<Colloidal Polyurea Particles>

The synthesis of polyurethane gel particles according to the invention can be conducted at a low temperature provided that a known catalyst is used. A reaction temperature of 40° C. or higher is, however, preferable from the viewpoint of the efficiency.

Colloidal polyurea particles used as an emulsifier in the synthesis of the fine polyurethane gel particles each consisting of a solvated portion and a non-solvated portion. The non-solvated portion preferably has a preferred particle size of about 0.01 to about 1 µm. Such colloidal polyurea particles can be obtained by, e.g., the reaction of an oil-modified polyol, polyisocyanate (or an NCO-terminated prepolymer composed of these compounds) and a polyamine compound in a non-aqueous medium.

As the reaction proceeds, insoluble urea domains are formed in the medium by hydrogen bonding of urea bonds and at the same time, the oil-modified polyol chains are solvated in the medium. This solvation prevents the growth of the colloidal polyurea particles due to coagulation of the insoluble urea domains. Stable colloidal polyurea particles can therefore be obtained easily.

Furthermore, the oil-modified polyol employed has a low crystallinity in the non-aqueous medium, and even in the process of polymer formation as a result of progress of the reaction, the polymer chains, composed mainly of the oil-modified polyol, can therefore still move around freely to some extent in the medium so that an insoluble crystalline portion and a soluble non-crystalline portion separate easily from each other, thereby forming a urea domain which has, as a core of the particle, an insoluble crystalline portion formed by the hydrogen bonding of urea bonds. The solvated polymer chains are regularly oriented outwardly around the urea domain. This action is fundamentally different from those of surfactants employed in known production methods of colloidal particles involving polymerization in the presence of micelles.

The above production process of the colloidal polyurea particles is described below more specifically. First, an oil-modified polyol and a polyisocyanate are reacted in a non-aqueous medium or in a solventless manner, whereby an NCO-containing prepolymer is synthesized. The resulting prepolymer is then charged in a stirrer-equipped jacketed synthesis reactor and its concentration is adjusted to about 5 to about 70 wt. % by adding a non-aqueous solvent. A solution of a polyamine compound, the concentration having been adjusted beforehand to about 2 to about 20 wt. %, is then gradually added to the above resultant solution with stirring to conduct a polyurea-forming reaction, whereby colloidal polyurea particles are produced.

The introduction of the polyamine can also be conducted by adding the prepolymer or its solution to the polyamine solution. Although no particular limitation is imposed on the temperature during the synthesis of the polymer, a preferable temperature is in the range of from about 30 to about 120° C. Although no particular limitation is imposed on the concentrations and temperature for the synthesis of the polymer, the type and stirring power of the agitator and the addition rates of the polyamine solution and the prepolymer or solution thereof, it is preferable to control the reaction to prevent too rapid a progress because the polyamine and the isocyanate groups of the prepolymer react quickly.

The oil-modified polyol usable for the production of the colloidal polyurea particles has difunctionality or lower valency and preferably has a molecular weight of approximately 1000±300, although not necessarily limited thereto. Exemplary oil-modified polyols include those modified to contain about two or fewer hydroxyl groups by the alcoholysis of various oils with a lower alcohol or glycol, partial saponification of oils or the esterification of hydroxyl-containing fatty acids with a glycol, and the oil-modified polyols described in POLYURETHANES, CHEMISTRY AND TECHNOLOGY PART 1, Chemistry (pp 48-53) (written by J. H. SAUNDERS and K. C. FRISCH, published in 1962). Examples of hydroxyl-containing fatty acids include ricinoleic acid, 12-hydroxystearic acid, castor oil fatty acids and hydrogenated castor oil fatty acids.

The oil-modified polyol and the polyisocyanate are reacted under conditions wherein approximately $1<NCO/OH\leqq 2$, to control the molecular weight of the resulting prepolymer chains to be solvated. Although no particular limitation is imposed on the molecular weight of the prepolymer so synthesized, the molecular weight is preferably from about 500 to about 15,000. Any known polyisocyanate can be used as the polyisocyanate usable in the invention. Particularly preferable examples include aliphatic and alicyclic diisocyanate compounds such as hexamethylene diisocyanate, hydrogenated TDI, hydrogenated MDI and isophorone diisocyanate.

Any non-aqueous solvent can be employed as a non-aqueous medium usable for the production of the colloidal polyurea particles, insofar as it can dissolve the starting materials, that is, the oil-modified polyol, diisocyanate and polyamine, and contains no active hydrogen therein. Particularly preferable examples include hydrocarbons such as hexane, heptane, octane, decane, cyclohexane, toluene and xylene. The term "dissolve" as used herein embraces both dissolution at room temperature and dissolution at temperatures higher than room temperature.

Illustrative of the polyamine compound usable for the production of the colloidal polyurea particles are ethylene diamine, diaminopropane, diaminobutane, hexamethylene diamine, trimethylhexamethylene diamine, N-aminoethylpiperazine, bis-aminopropylpiperazine, polyoxypropylenediamine, 4,4'-diaminodicyclohexylmethane, isophorone diamine, thiourea, methyliminobispropylamine and like diamines. They can be used preferably either singly or in combination.

The kinds and amounts of the oil-modified polyol, diisocyanate, polyamine and resulting prepolymer, which are usable in the production of colloidal polyurea particles, and their ratios can be determined for the purpose of controlling the size and stability of the colloidal polyurea particles in the solvent employed. In other words, the colloidal polyurea particles according to the present invention are each formed of a urea domain, which is a crystalline portion not solvated by the solvent, and polymer chains which extend from the urea domain and are solvated by the solvent.

The properties of the colloidal polyurea particles are determined by the size and form of the polymer chains. As described above, the colloidal polyurea particles formed individually of an urea domain and solvated polymer chains take the form of a stable colloidal polyurea dispersion in a solvent. The urea domain of each colloidal polyurea particle in the dispersion ordinarily has a particle size of about 0.01 to about 1 µm. The solvated polymer chains each have a molecular weight of about 500 to about 15,000. The weight ratio of the urea domain (urea bonds or polyamine) to the polymer chains (urea domain/polymer chains) preferably ranges from about 0.5 to about 30. When the ratio of the urea bonds is too small, non-solvated urea domains can not be formed easily in the resulting colloidal polyurea particles, thereby facilitating dissolution of the colloidal polyurea particles in the non-aqueous medium. Accordingly good colloidal polyurea particles can not be formed. If, on the other hand, the ratio of the urea bonds is too great, the non-solvated urea domains become excessive, thereby lowering the stability of the resulting colloidal polyurea particles and making the colloidal polyurea particles more apt to coagulate.

The above-mentioned colloidal polyurea dispersion seems to have a bluish opaque to yellowish opaque color due to irregular reflection of light. The colloidal polyurea dispersion, after being dried and solidified, can be easily re-dispersed in a hydrocarbon solvent of relatively low dissolving power and can be made into a colloidal polyurea dispersion of a desired concentration. It is substantially soluble in polar solvents such as dimethyl formamide, formamide, dimethyl sulfoxide, methylethylketone and butyl acetate. Addition of a solvent having a low dissolving power such as that described above in a proper amount to such a solution causes precipitation and crystallization of urea bonds in the polymer, thereby forming non-solvated urea domains. A colloidal polyurea dispersion is hence provided.

The colloidal polyurea particles are heterogeneous particles each composed of a urea domain, i.e., a non-solvated crystalline portion, and solvated polymer chains, so that they have properties of both the non-solvated urea domain and the solvated polymer chains. As one example, when colloidal polyurea particles which had been synthesized by reacting an NCO-containing prepolymer and a polyamine compound at an $NCO/NH_2$ molar ratio of 1 were applied as a dispersion having solids content of 10 wt. % onto a glass plate to give a film with a dry film thickness of 10 µm, followed by drying to form a film, the resulting dry film had excellent transparency, was free of adhesiveness and surprisingly, had a melting point as high as at least 200° C.

In a solvent, the colloidal polyurea particles useful in the invention are presumed to take such a form as shown in FIG. 1. The colloidal polyurea particles comprise solvated polymer chains 11 extending outwards around the urea domain 12 of the non-solvated portion. It is possible to control the particle size of the colloidal polyurea particles by controlling the overall size of each particle containing the solvated polymer portion and the urea domain, and also the sizes of the solvated polymer portion and the urea domain individually. The particle size of the colloidal polyurea particles in the dispersion indicates that of the urea domain portion.

To produce a stably-controlled dispersion of colloidal polyurea particles, it is desirable to have a distinct phase separation, between the solvated polymer portion and the urea domain portion, as is shown in FIG. 1. To achieve this, it is necessary to form each particle without allowing the solvated polymer chains and the crystalline urea domains to exist as a mixture, and for this purpose, the synthesis conditions permitting easy separation between them are required.

The lower the concentrations of both the solutions of the NCO-containing prepolymer and the polyamine compound, and the lower the addition rate of one of the solutions to the other solution, the better the results. It is sufficient to stir them with a propeller mixer. Where the raw material solutions have high concentrations and/or the addition rate is high, it is desirable to conduct the synthesis while mixing them under a high shear force in a homogenizer or the like. The reaction temperature depends on the kind of the solvent employed and the solubility of the urea domains in the solvent. Preferably, the temperature is about 30 to about 120° C., at which the synthesis can easily be controlled, although not necessarily limited thereto. Urea domains can be formed in the course of the synthesis or alternatively in the course of cooling particles synthesized at a high temperature.

Factors important with respect to the colloidal polyurea particles are the kind and concentration of their surface groups as well as their dispersibility in the inert liquid and their particle size after dispersion. When the colloidal polyurea particles serve as an emulsifier, they can exhibit their action as an W/O or O/O-type emulsifier on the basis of relationship between the degree of hydrophilicity or hydrophobicity of the polyisocyanate compound, the active-hydrogen-containing compound and the inert liquid. As a result of an investigation conducted with these conditions in mind, the particle size of the fine polyurethane gel particles can be controlled by adjusting the amount of colloidal polyurea particles relative to the amounts of polyisocyanate and active-hydrogen-containing compound. The greater the amount of the colloidal polyurea particles in the above range, the smaller the particle size of the resulting polyurethane gel particles; the smaller the amount thereof, the greater the particle size.

<Separation of Polyurethane Gel Composite Particles>

The polyurethane gel composite particles of the invention can be obtained by, under normal or reduced pressure, separating the inert liquid from the dispersion of polyurethane produced from the above-described raw materials. Any apparatus known for producing particles, such as a spray drier, filter-equipped vacuum drier, stirrer-equipped vacuum drier and tray type drier, are all usable. A preferable drying temperature may be usually within the range of from 40 to 80° C. under reduced pressure, although this depends on the vapor pressure of the inert liquid, and the softening point and particle size of the fine polyurethane gel particles.

Where the composition of polyurethane is the same, the control of the particle size is affected by the manner of emulsification (e.g., propeller-type stirrer, anchor-type stirrer, homogenizer, spiral agitator or the like) in the synthesis reactor and the intensity of the stirring force. In particular, the particle size is governed by the concentrations of the polyisocyanate and the active-hydrogen-containing compound in the inert liquid and also by the kind and amount of the colloidal polyurea particles added. The mechanical stirring and shear force for emulsification of the polyisocyanate and active-hydrogen-containing compound are determined at the initial stage of the emulsification. The stronger the mechanical stirring and shear force, the smaller the particle size. The stirring and shear force exerted thereafter do not affect significantly. An excessive intensity promotes the agglomeration of the dispersions, and have undesirable.

In the present invention, in the production of the fine polyurethane gel particles, it is also possible to produce polyurethane incorporating in at least some or all of the raw materials various additives, such as colorants such as dyes and pigments, plasticizers, stabilizers, antioxidants, ultraviolet absorbers, anti-static agents, abrasive materials and extender pigments.

<Properties of Polyurethane Gel Composite Particles>

The polyurethane gel composite particles thus produced are in the form of true spherical or substantially true spherical particles having an average particle size of about 0.5 to about 100 μm. These particles when used for a material for a golf ball have an average particle size of preferably about 2 to about 100 μm, and more-preferably about 2 to about 70 μm, and most preferably about 5 to about 30 μm. When the polyurethane gel composite particles have a particle size within the foregoing ranges, The true spherical particles as a whole do not become too bulky to mix or process with the base material. Moreover, the adhesion between the polyurethane gel composite particles and the base material does not diminish and the properties of the base material do not degraded.

In this specification, average particle size is measured by the method described in a working example given later.

The hardness of the polyurethane gel composite particles thus produced is affected by the molecular weights and structures of the polyisocyanate compound and the active-hydrogen-containing compound. The hardness is also affected by the concentration, kind and amount of colloidal polyurea particles, and is in the range of about 55 to about 98 in terms of JIS-A hardness (hardness measured by use of type-A durometer prescribed in JIS K7215 (method of testing durometer hardness of plastics)). A preferable hardness is about 60 to about 80 according to JIS-A hardness. If the hardness of the polyurethane gel composite particles is within the foregoing ranges, the resulting golf ball can attain a satisfactory ball bounce resilience, leading to a long carry distance and to a soft feel.

The specific gravity of the polyurethane gel composite particles is within the range of about 1.1 to about 1.3, depending on the concentrations of the polyisocyanate compound and the active-hydrogen-containing compound in the inert liquid, and the kind and amount of the colloidal polyurea particles. A preferable specific gravity is within the range of about 1.12 to about 1.24. When fine particles which are higher in specific gravity than the base material are incorporated into the cover, the golf ball is made to stably roll by the increased moment of inertia of the cover.

In the present invention, functional groups such as hydroxyl group (—OH group), carboxyl group (—COOH group), and mercapto group (thiol group; —SH group) and the like can be introduced into all of the polyurethane gel composite particles, including the colloidal polyurea particles, by adjusting the NCO/OH ratio of the polyisocyanate compound and the active-hydrogen-containing compound in synthesis, by changing the composition of the active-hydrogen-containing compound, and/or by surface-treating the finished colloidal polyurea particle beads, etc. More specifically the non-solvated portion of colloidal polyurea particles may be formed by bonding with these functional groups. The introduction of such functional groups can increase the adhesion between the cover and the intermediate layer, and the adhesion between the intermediate layer and the core, and can improve the adhesion between the cover and the core, whereby the golf ball is made much more durable.

Figure 2:
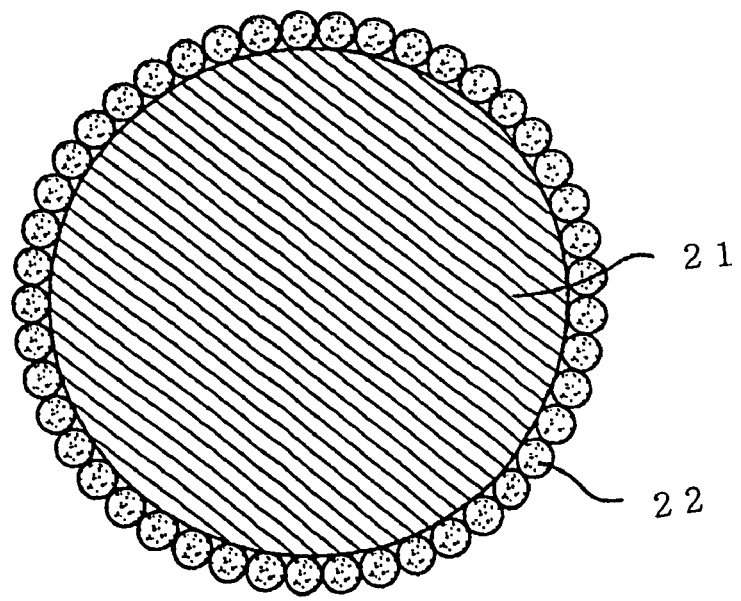
FIG. 2 shows the presumed structure of the polyurethane gel composite particles.

As illustrated in the imaginary sketch of FIG. 2, the colloidal polyurea particles 22 are adhere to or are made to cover the surface of each thermosetting fine polyurethane gel particle 21 three-dimensionally crosslinked, and the colloidal polyurea particles 22 have excellent non-adherence and high heat resistance so that the polyurethane gel composite particle having an extremely high flowability can be obtained simply by separating the particles from the dispersion medium. Unlike the techniques in the prior art, the present invention has various advantages, for instance, it does not require a cumbersome and costly grinding step, or a classification procedure in forming the resulting polyurethane into fine particles.

With respect to the polyurethane gel composite particles thus obtained, the particle size can be easily controlled so that the particle size distribution is relatively narrow.

The polyurethane gel composite particles thus obtained are covered with colloidal polyurea particles, so that they can exhibit high dispersibility in the base material and can be easily dispersed in the base material without use of a dispersion stabilizer. Further, when the polyurethane gel composite particles are thermally mixed with the base material, the colloidal polyurea particles do not separate from the polyurethane gel particles. Further more, since thermosetting polyurethane is used as the material for the polyurethane gel particles, the fine particles do not dissolve out into the base material nor gel with the base material when thermally mixed with the base material.

Since the polyurethane gel composite particles are excellent in flowability and lubricity, the core and/or layers of a golf ball can be easily molded using the composition containing the fine particles.

First Golf Ball-Forming Composition

The first composition for forming a golf ball according to the invention comprises the above-described polyurethane gel composite particles and an ionomer resin as a base material. The composition can be suitably used as a material for forming the cover and the intermediate layer of a multi-piece golf ball.

The amount of the polyurethane gel composite particles to be used is usually about 0.1 to about 40 parts by weight, and preferably about 1 to about 20 parts by weight, per 100 parts by weight of base material. Insofar as the amount with the above-mentioned range, the effect of addition of the particles is satisfactorily achieved. Due to the addition of the polyurethane gel composite particles, neither the ball bounce resilience derived from the ionomer resin is lowered nor the carry distance is reduced.

<Ionomer Resin>

Usable ionomer resins include those in which at least a portion of the carboxyl groups in an olefin-unsaturated carboxylic acid copolymer are neutralized with a metal ion, and those in which at least a portion of the carboxyl groups in an olefin-unsaturated carboxylic acid-unsaturated carboxylic acid ester terpolymer are neutralized with a metal ion.

Useful olefins include, for example, olefins having 2 to 8 carbon atoms, and more specifically ethylene, propylene, butene, pentene, hexene, heptene, octene and the like. Ethylene is especially preferable.

Examples of unsaturated carboxylic acid are acrylic acid, methacrylic acid, fumaric acid, maleic acid and crotonic acid. Among these, acrylic acid and methacrylic acid are preferable.

Examples of unsaturated carboxylic acid ester are lower alkyl ester having 1 to 4 carbon atoms such as methyl, ethyl, propyl, n-butyl and iso-butyl esters of acrylic acid, methacrylic acid, fumaric acid, maleic acid and crotonic acid.

An olefin-unsaturated carboxylic acid copolymer or olefin-unsaturated carboxylic acid-unsaturated carboxylic acid ester copolymer can be prepared by subjecting these compounds to random copolymerization. Some are commercially available, e.g., products of Dupont Mitsui Polychemical Co., Ltd., trade names Nucrel N1560, Nucrel N1214 and Nucrel N1035 (olefin-unsaturated carboxylic acid copolymers); and products of Dupont Mitsui Polychemical Co., Ltd., trade names Nucrel AN4311 and Nucrel AN4318 (olefin-unsaturated carboxylic acid-unsaturated carboxylic acid ester copolymers).

Useful metal ions are, for example, sodium, potassium, lithium, magnesium, calcium, zinc, barium, aluminium, tin, zirconium and cadmium ions, among which of sodium, zinc and magnesium ions are preferable in view of ball bounce resilience and durability.

Preferable among the above examples of ionomer resins are sodium ion-neutralized ethylene-(meth)acrylic acid copolymers, zinc ion-neutralized ethylene-(meth)acrylic acid copolymer, sodium ion-neutralized ethylene-(meth)acrylic acid-(meth)acrylic acid ester terpolymers, and zinc ion-neutralized ethylene-(meth) acrylic acid-(meth)acrylic acid ester terpolymers. Of these examples, a mixture of a sodium ion-neutralized copolymer and a zinc ion-neutralized copolymer is more preferable.

Examples of useable ionomer resins are trade names Himilan 1555, 1557, 1605, 1702, 1705, 1706, 1707 and 1855 (products manufactured by Mitsui Dupont Polychemical Co., Ltd.), trade names Surlyn 8945, 9945, 6320, 8320 and 9320 (products manufactured by Dupont Co., Ltd.), and trade names IOTEK 7010 and 8000 (products manufactured by EXXON MOBIL CHEMICAL Co., Ltd.).

The base material preferably includes at least 60 wt. %, and more preferably at least 80 wt. %, of an ionomer resin. The above-mentioned contents of ionomer resin gives a sufficient ball bounce resilience.

<Other Components>

To improve its softness, the layer containing the particles may contain an olefin-unsaturated carboxylic acid copolymer or an olefin-unsaturated carboxylic acid-unsaturated carboxylic acid ester terpolymer in addition to the ionomer resin. Examples of the olefin, unsaturated carboxylic acid, and unsaturated carboxylic acid ester are as described above.

Specific examples of olefin-unsaturated carboxylic acid copolymer are Nucrel 1560, 1214 and 1035 (products of Dupont Mitsui Polychemical Co., Ltd.); trade names ESCOR 5200, 5100 and 5000 (products of EXXON MOBIL CHEMICAL Co., Ltd.). Examples of olefin-unsaturated carboxylic acid-unsaturated carboxylic acid ester terpolymer are trade names Nucrel AN4311 and AN4318 (products of Dupont Mitsui Polychemical Co., Ltd.), and ESCOR ATX310 and ESCOR ATX320 (products of EXXON MOBIL CHEMICAL Co., Ltd.).

The layer containing the particles may further contain a known thermoplastic elastomer, diene-based block copolymer or like known materials for the cover or intermediate layer of a multi-piece golf ball in a range which does not impair the properties of the ionomer resin.

Useful thermoplastic elastomers include a wide range of known elastomers such as polyurethane-based, polyamide-based, polyester-based, styrene-based and olefin-based elastomers. Specific examples of thermoplastic elastomers include the polyamide-based thermoplastic elastomer, trade name PEBAX 2533 (product of ATOFINA Co., Ltd.), the polyester-based thermoplastic elastomers, trade names Hytrel 3548 and 4047 (products of DUPONT-TORAY CO., LTD.), the polyurethane-based thermoplastic elastomers, trade name Elastolan ET880 (product of BASF Japan Co., Ltd.), and trade names Pandex T-8180, T-7298, T-7895 and T-7890 (products of DIE Bayer Polymer Ltd.), etc.

Examples of usable styrene-based thermoplastic elastomers are trade names Rabalon SJ7400N and SJ5400N (products of Mitsubishi Chemical Corp.) and trade names LEOSTOMER LJ1040N and LJ1050N (products of RIKEN TECHNOS CORP.). Examples of olefin-based thermoplastic elastomers are Thermorun 3602N and 3702N (products of Mitsubishi Chemical Corp.), and trade name LEOSTOMER LE3040N (product of RIKEN TECHNOS CORP.).

Examples of usable diene-based block copolymers include conjugated diene-based block copolymers having a double bond or a partially hydrogenated block copolymer thereof, such as a block copolymer of an aromatic vinyl compound with a conjugated diene-based compound or a partially hydrogenated copolymer thereof. Useful aromatic vinyl compounds include, for example, styrene, α-methyl styrene, vinyl toluene, p-t-butyl styrene, 1,1-diphenyl styrene and the like. Useful conjugated diene-based compounds are, for example, butadiene, isoprene, 1,3-pentadiene, 2,3-dimethyl-1,3-butadiene and the like. Aromatic vinyl compounds and conjugated diene-based compounds can be used singly or in combination. Examples of diene-based block copolymers are the trade name "EPOFRIEND" series (products of DAICEL CHEMICAL INDUSTRIES), and the trade name "SEPTON" series (products of KURARAY CO., LTD.).

The base material may contain known additives as usually incorporated into the cover or the intermediate layer of a golf ball. Useful additives include, for example, fillers, coloring agents, antioxidants, ultraviolet absorbers and so on.

Second Golf Ball-Forming Composition

The second composition for forming a golf ball according to the invention comprises the above-described polyurethane gel composite particles and polyurethane as the base material. The composition can be suitably used as a material for forming the cover and the intermediate layer of a multi-piece golf ball.

The amount of the polyurethane gel particles to be used is about 0.1 to about 40 parts by weight, and preferably about 1 to about 20 parts by weight, per 100 parts by weight of base material. Insofar as the amount of the polyurethane gel composite particles to be used within the above-mentioned ranges, sufficient softness and ball bounce resilience can be obtained and the moldability and durability are not impaired by addition of the polyurethane gel composite particles.

<Polyurethane>

Useable polyurethanes include, for example, thermoplastic polyurethane elastomers and thermosetting polyurethanes.

The thermoplastic polyurethane elastomer can be prepared by reacting a diisocyanate, a high molecular polyol and a chain extender.

Useful diisocyanates are not limited and can be selected from a wide range of known diisocyanates for use as the raw material for the thermoplastic polyurethane elastomer. Examples of known diisocyanates include tolylene diisocyanate (TDI), 4,4'-diphenylmethane diisocyanate (MDI), 4,4'-dicyclohexylmethane diisocyanate (H12MDI), isophorone diisocyanate (IPDI), hexamethylene diisocyanate (HDI), 2,2,4-(2,2,4)trimethylhexamethylene diisocyanate (TMDI), lysine diisocyanate (LDI) and so on.

Among these, preferable are 4,4'-diphenylmethane diisocyanate (MDI), 4,4'-dicyclohexylmethane diisocyanate (H12MDI), isophorone diisocyanate (IPDI) and hexamethylene diisocyanate (HDI). From the viewpoint of the properties of the ball, MDI is desirable but is likely to change color when the resulting polyurethane is used as a material for the cover. However, this problem can be overcome by incorporating into the cover an ultraviolet absorber, antioxidant, light stabilizer and/or the like. To avoid the tendency of changing color, H12MDI, IPDI and HDI, i.e., aliphatic isocyanates, are preferred.

Useful high molecular weight polyols can be selected from a wide range of known high molecular weight polyols for use as the raw material for thermoplastic polyurethane elastomers. Such high molecular weight polyols include polyether-based diols, polyester-based diols and polycarbonate-based diols. Polytetramethylene glycol is useful as a polyether-based diols. Useful as polyester-based diols are polyethylene adipate diols, polybutylene adipate diols, polyhexa-methylene adipate diols, poly-ϵ-caprolactone diols and the like. Useful polycarbonate-based diols include polyhexamethylene carbonate diols.

The high molecular weight polyol has a molecular weight of preferably about 300 to about 5000, more preferably about 500 to about 4500, and most preferably about 1000 to about 4000.

The kinds of useful chain extenders are not limited, and can be selected from a wide range of known chain extenders useful as the raw material for thermoplastic polyurethane elastomers. Examples of such known chain extenders include ethylene glycol, 1,3-propylenediol, 1,3-butanediol, 1,4-butanediol, 1,6-hexanediol, 1,4-bis(2-hydroxyethoxy)benzene, etc. Among these, ethylene glycol, 1,4-butanediol and 1,6-hexanediol are preferable.

The thermosetting polyurethane is cross-linked and is formed from an isocyanate, polyol, and a chain extender, a crosslinking agent and an active-hydrogen compound called a curing agent. It is made by a prepolymer method in which an isocyanate and polyol are reacted, giving an isocyanate-terminated prepolymer to which a curing agent is mixed for reaction.

The kinds of isocyanates are not limited, and useful isocyanates can be selected from a wide range of isocyanates known as raw material for polyurethane.

Such known isocyanates are, for example, tolylene diisocyanate (TDI), 4,4'-diphenylmethane diisocyanate (MDI), polymeric MDI, 4,4'-dicyclohexylmethane diisocyanate (H12MDI), isophorone diisocyanate (IPDI), hexamethylene diisocyanate (HDI), tolidine diisocyanate (TODI), 1,5-naphthalene diisocyanate (NDI), p-phenylene diisocyanate (PPDI), p-xylene diisocyanate (PXDI), m-xylene diisocyanate (MXDI), isophorone diisocyanate (IPDI) and so on.

Tolylene diisocyanate (TDI), 4,4'-diphenylmethane diisocyanate (MDI) and polymeric MDI are mostly used among these. A cover formed of polyurethane prepared from these isocyanates is apt to discolor and therefore preferably incorporates therein an ultraviolet absorber, antioxidant, and light stabilizer to guard against discoloration. To obtain polyurethane which is unlikely to discolor, aliphatic isocyanates, e.g. 4,4'-dicyclohexylmethane diisocyanates (H12MDI), isophorone diisocyanate (IPDI) and hexamethylene diisocyanate (HDI) are preferred.

The polyol can be selected from a wide range of polyols known as raw materials for polyurethane and having a molecular weight of about 500 to about 5000 and at least 2 hydroxyl groups in a molecule. Useful polyether polyols are, for example, polyethylene glycol (PEG), polytetramethylene glycol (PTMG), polypropylene glycol (PPG) and so on. Useful polyester polyols are polyethylene adipate (PEA), polybutylene adipate (PBA), polyhexamethylene adipate (PHMA), polycaprolactone polyol, and so on. Polycarbonate polyols include, for example, polyhexamethylene carbonate.

No particular limitation is imposed on the curing agent to be used. Useful curing agents can be selected from a wide range of curing agents known for use with polyurethanes. Known amine-based such curing agents include, for example, 4,4'-methylenebis-2-chloroaniline (MOCA), diethyltoluenediamine (DETDA), dimethylthiotoluenediamine (MDTDA), 4,4'methylenebis(3-chloro-2,6-diethyl)-aniline, 4-4'-methylenebis(N-sec-butylaniline). Glycol-based curing agents are, for example, 1,3-butanediol (1,3BR), 1,4-butanediol(1,4BR), trimethylolpropane (TMP), bishydroxyethoxybenzene (BHEB), and so on. The amount of curing agent is not limited, but is preferably at an $NH_2/NCO$ molar ratio of 0.85 to 1.15 (relative to the isocyanate-terminated prepolymer).

The curing agents to be used in combination with TDI are preferably 4,4' methylenebis-2-chloroaniline (MOCA), diethyltoluenediamine (DETDA), dimethylthiotoluenediamine (MDTDA), 4,4'methylenebis(3-chloro-2,6-diethyl)-aniline, 4-4'-methylenebis(N-sec-butyl aniline), and so on. The curing agents to be used in combination with MDI of isocyanate are preferably 1,4-butanediol (1,4-BR), trimethylolpropane (TMP) and bishydroxyethoxy benzene (BHEB).

The polyurethane-forming composition can contain a known catalyst to be used for the reaction of urethane. Useful catalysts include dibutyltin dilaurate (DBTDL), dioctyltin dilaurate (DOTDL), lead naphthenate and like metal-based catalysts and triethylene diamine (TEDA), 1,8-diazabicyclo (5,4,0)undecene-7 (DBU) and like amine-based catalysts among which triethylene diamine is preferred.

Preferable examples of polyurethane resins are thermoplastic polyurethanes such as Elastolan ET880, 1190A and 1154D (products of BASF Japan Co., Ltd.), Pandex T-8180, T-7298, T-7895 and T-7890 (products of DIC BAYER Co., Ltd.) and so on. Examples of isocyanate-terminated prepolymer to be used for thermosetting polyurethanes are trade names ADIPRENE LF 0.800A, LF900A, LF950 and LF600D (products of Uniroyal Chemical Co., Ltd.), Colonate 4080, 4090 and 4095 (products of Nippon Polyurethane Industry Co., Ltd.) and so on. Examples of the curing agent are LONZACURE M-CDEA (product of Uniroyal Chemical Co., Ltd.), POLAMINE 250P (product of Air Products & Chemicals Co., Ltd.), and so on.

The base material preferably contains polyurethane in an amount of at least 60 wt. %, and more preferably at least 80 wt. %. Satisfactory durability can be obtained when the polyurethane is present within the above-mentioned ranges.

The composition may contain a known thermoplastic elastomer, diene-based block copolymer or the like as raw material for the cover or the intermediate layer of a multi-piece golf ball in a range in which the properties of polyurethane are not degraded. These materials are as described above.

Further, the base material may contain known additives as usually incorporated into the cover or intermediate layers of golf balls. These additives are as described in respect of the first composition.

Third Golf Ball-Forming Composition

The third composition for forming a golf ball according to the invention comprises the previously-described polyurethane gel composite particles and butadiene rubber as the base material. The composition can be suitably used as a material for forming the core and the intermediate layer of a multi-piece golf ball.

The amount of the polyurethane gel composite particles to be used in this case is about 0.1 to about 30 parts by weight, and preferably about 1 to about 15 parts by weight, per 100 parts by weight of base material. Insofar as the amount of the polyurethane gel composite particles is within the above-mentioned range, the softness, soft feel and increased adhesion between adjacent layers can be achieved by the addition of fine particles, and the amount of the particles would impair neither the durability nor the ball bounce resilience, both properties being inherently derived from the butadiene rubber.

<Butadiene Rubber>

The kind of butadiene rubber is not limited, although it is preferable to use a high-cis polybutadiene rubber containing 40% or more, especially 80% or more, of cis-1,4-bonds. The base material contains preferably 60 wt. % or more, and more preferably 80 wt. %, of butadiene rubber. Natural rubber, polyisoprene rubber, styrene butadiene rubber and/or ethylene-propylene-diene rubber (EPDM) may be added to the butadiene rubber in a range in which the properties of the butadiene rubber are not degraded.

<Other Components>

The third golf ball-forming composition may contain additives usually added to a rubber composition useful as the material for the core of a golf ball, such additives including, for example, crosslinking agents, co-crosslinking agents, fillers, antioxidants, peptizers and so on.

Useful crosslinking agents include known compounds known for use with rubbers, such crosslinking agents including dicumyl peroxide, t-butyl peroxide and like organic peroxides among which dicumyl peroxide is preferable. The amount of the crosslinking agent is not limited and can be suitably selected from a wide range, however the crosslinking agent is usually used in an amount of about 0.5 to about 3 parts by weight, and preferably about 0.7 to about 2.2 parts by weight, per 100 parts by weight of rubber in the base material. If the amount of the crosslinking agent is within the above-mentioned ranges, the obtained golf ball attains an excellent ball bounce resilience and thus a long carry distance as well as a satisfactory soft feel.

The kinds of the co-crosslinking agents are not limited, and known compounds can be selected for use from a wide range of rubber co-crosslinking agents. Examples of such co-crosslinking agents include metal salts of unsaturated carboxylic acids, especially metal salts of monovalent or bivalent unsaturated carboxylic acids of 3 to 8 carbon atoms such as acrylic acid or methacrylic acid. To acquire a high ball bounce resilience, a zinc salt of acrylic acid is preferable.

The amount of the co-crossliking agent is not limited and can be suitably selectable from a wide range, however it is usually within the range of about 5 to about 40 parts by weight, and preferably about 10 to about 35 parts by weight, per 100 parts by weight of rubber in the base material. If the amount is within the foregoing ranges, the obtained golf ball achieves a high ball bounce resilience, and therefore a long carry distance and gives a satisfactory soft feel.

Useful fillers can be selected for use from a wide range of known fillers employed in this field, such as zinc oxide, barium sulfate, calcium carbonate, tungsten powder, molybdenum powder and organic fillers. The amount of filler is not limited but is selectable from a wide range and is usually about 1 to about 40 parts by weight, per 100 parts by weight of the base material. The weight of the obtained golf ball will be appropriate insofar as the amount of the filler is within the foregoing range.

(II) Multi-Piece Golf Ball

Summary of Structure

The multi-piece golf balls of the invention include: a two-piece golf ball comprising a core and a cover; a three-piece golf ball comprising a core, an intermediate layer and a cover; and a four-piece golf ball comprising a core, a first intermediate layer, a second intermediate layer and a cover.

The multi-piece golf balls of the invention embrace balls formed of materials as described below (i) to (vi) even when the balls assume any of the above-mentioned forms.

The term "layer" used herein includes not only flat layered portions but also portions in a spherical or other form.

(i) A ball having a cover formed of a composition comprising polyurethane gel composite particles and an ionomer resin as the base material (first composition of the invention) (first ball)

(ii) A ball having a cover formed of a composition comprising polyurethane gel composite particles and polyurethane as the base material (second composition of the invention) (second ball)

(iii) A ball having an intermediate layer, such that when the intermediate layer consists of one layer, the layer is formed of a composition comprising polyurethane gel composite particles and an ionomer resin as the base material (first composition of the invention), and when the intermediate layer consists of two or more sub-layers, one or more of the sub-layers are formed of the first composition of the invention (third ball)

(iv) A ball having an intermediate layer, such that when the intermediate layer consists of one layer, the layer is formed of a composition comprising polyurethane gel composite particles and polyurethane as the base material (second composition of the invention), and when the intermediate layer consists of two or more sub-layers, one or more sub-layers are formed of the second composition of the invention (fourth ball)

(v) A ball having an intermediate layer, such that when the intermediate layer consists of one layer, the layer is formed of a composition comprising polyurethane gel composite particles and butadiene rubber as the base material (third composition of the invention), and when the intermediate layer consists of two or more sub-layers, one or more sub-layers are formed of the third composition of the invention (fifth ball)

(vi) A ball such that the core is formed of a composition comprising polyurethane gel composite particles and butadiene rubber as the base material (third composition of the invention) (sixth ball).

In any of the balls (i) to (vi), any layer other than the layer containing the polyurethane gel composite particles may be composed of hitherto known compositions for forming multi-piece golf balls.

(i) First Ball

The first ball has a cover comprising an ionomer resin as the base material and polyurethane gel composite particles.

Core

The core may be composed of a known rubber composition as a material for cores. Useful base rubbers include both natural rubber and synthetic rubbers. Among these, high-cis polybutadiene rubber containing 40% or more, and especially 80% or more, of cis-1,4-bonds are preferable. When required, natural rubber, polyisoprene rubber, styrene butadiene rubber, ethylene-propylene-diene rubber (EPDM) and/or the like may be added to such a high-cis polybutadiene rubber. Base rubbers can be used singly or in combination.

The rubber composition may further contain crosslinking agents, co-crosslinking agents, fillers, antioxidants, peptizers and the like.

Usable crosslinking agents are known rubber crosslinking agents, such as dicumyl peroxide, t-butyl peroxide and like organic peroxides, among which dicumyl peroxide is desirable. The amount of the crosslinking agent is not limited and is suitably selectable from a wide range, it is usually about 0.5 to about 3 parts by weight, and preferably about 0.7 to about 2.2 parts by weight, per 100 parts by weight of the base rubber. Insofar as the amount is within the foregoing ranges, satisfactory ball bounce resilience and thus a long carry distance can be achieved and a sufficient soft feel can be attained by the obtained golf ball.

Useful co-crosslinking agents are not limited and can be selected from a wide range of compounds known as rubber co-crosslinking agents. Examples of such co-crosslinking agents include metal salts of unsaturated carboxylic acids, especially metal salts of monovalent or bivalent unsaturated carboxylic acids of 3 to 8 carbon atoms such as acrylic acid or methacrylic acid. To acquire a high ball bounce resilience, a zinc salt of acrylic acid is preferable.

The amount of the co-crosslinking agent is not limited and can be suitably selected from a wide range, however it is within the range of about 5 to about 40 parts by weight, and preferably about 10 to about 35 parts by weight, per 100 parts by weight of the base rubber. If the amount is within the foregoing ranges, the obtained golf ball exhibits a high ball bounce resilience and therefore a long carry distance and gives a satisfactory soft feel.

Useful fillers can be selected for use from a wide range of known fillers employed in this field, such as zinc oxide, barium sulfate, calcium carbonate, tungsten powder, molybdenum powder and organic fillers. The amount of filler is not limited and can be selected from a wide range of those employed in the art. It is however preferably about 1 to about 40 parts by weight, per 100 parts by weight of the base rubber. The weight of the obtained golf ball will be appropriate insofar as the amount of the filler is within the foregoing range.

The core can be molded by known methods such as compression molding using the above-mentioned rubber composition for the core.

Intermediate Layer

An intermediate layer is absent in a 2-piece golf ball, whereas one intermediate layer is present in a 3-piece golf ball, and a first intermediate sub-layer and a second intermediate sub-layer are present in a 4-piece golf ball.

Intermediate layers can be formed of a resin composition comprising, as the main component, an ionomer resin or a thermoplastic elastomer known as materials for the intermediate layers of multi-piece golf balls, or a mixture thereof. The intermediate layer may be composed of a rubber composition.

Ionomer resins are as described previously.

Useful thermoplastic elastomers include a wide range of known elastomers such as urethane-based, polyamide-based, polyester-based, styrene-based and olefin-based elastomers. Specific examples of the thermoplastic elastomer include polyamide-based thermoplastic elastomer Pebacks 2533 (product of ATOFINA Co., Ltd.), polyester-based thermoplastic elastomer Hitrel 3548 and 4047 (products of Toray-Dupon Co., Ltd.), polyurethane-based thermoplastic elastomers Elastoran ET880 (product of BASF Japan Co., Ltd.) and Pandex T-8180, T-7298, T-7895 and T-7890 (products of DIC Bayer Polymer Co., Ltd.), etc. Preferable thermoplastic elastomers are urethane-based elastomers.

When the intermediate layer is formed from a rubber composition, the kinds of base rubber and other components to be used are as described previously in the description of the core. It is preferable, however, to use about 0.1 to about 3 parts by weight, and especially about 1 to about 2 parts by weight, of crosslinking agent; about 5 to about 40 parts by weight, especially about 10 to about 35 parts by weight, of co-crosslinking agent; and about 20 to 40 parts by weight of filler, per 100 parts by weight of the base rubber. Preferable base rubbers include butadiene rubber. Particularly preferable are high-cis polybutadiene rubbers containing 40% or more, and preferably 80% or more, of cis-1,4-bonds.

Materials for forming the intermediate layer include fillers, pigments, antioxidants and like known additives for golf balls in addition to the base materials or base rubber.

An intermediate layer made from a resin composition can be formed by known methods, e.g., injection molding, and an intermediate layer made from a rubber composition can also be formed by known methods, e.g., compression molding.

When the intermediate layer is composed of two sub-layers, the two sub-layers may be formed of materials different to each other in formulation, but within the ranges for the above-described resin composition and/or rubber composition.

Cover

The cover is a layer containing polyurethane gel composite particles and an ionomer resin as the base material. In forming the cover from these materials, a known method such as injection molding is carried out using a mixture of an ionomer resin and polyurethane gel composite particles in the above-mentioned proportions, or when the particles are unsatisfactorily dispersed because the particles are used in a larger proportion, a mixture thereof obtained by kneading them with a kneader. Examples of kneader include known kneaders such as single screw extruders, double screw extruders, kneaders, Banbury mixers and so on.

Preferable Combinations of Materials for Layers

As a first ball having a cover formed from an ionomer resin as the base material and polyurethane gel composite particles, preferable are a 2-piece golf ball containing butadiene rubber as the core base material; a 3-piece golf ball containing butadiene rubber as the core base material, and butadiene rubber, polyurethane or ionomer resin as the intermediate layer base material; and a 4-piece golf ball containing butadiene rubber as the core base material, and butadiene rubber, polyurethane or ionomer resin which may be the same or different as the base material for the first and second intermediate sub-layers.

A ball having an intermediate layer containing polyurethane gel composite particles and a polyurethane base material is also preferred as the first ball having a cover formed of polyurethane gel composite particles and an ionomer resin as the base material.

Shape of the Layers

In the multi-piece golf balls of the invention formed of any of these materials, whether any of 2-piece golf balls, 3-piece golf balls or 4-piece golf balls, the core, intermediate layer and cover can limitlessly assume various shapes without limit insofar as they can be actually used for golf balls, balls comprising a 'layered' intermediate layer and a cover concentrically formed on the surface of a spherical core.

Referring to the size of a golf ball comprising concentrically formed layers, a 2-piece golf ball has a core of about 40.8 to about 36.7 mm in diameter and a cover thickness of about 1 to about 3 mm, and preferably about 1.5 to about 2.5 mm.

A 3-piece golf ball or a 4-piece golf ball has a core of about 29 to about 39 mm diameter, and preferably about 33 to about 37 mm, plus intermediate layer of about 0.5 to about 4 mm in overall thickness, and preferably about 1 to about 2.5 mm. The thickness of the cover is the same as that of the 2-piece golf ball, i.e. about 1 to about 3 mm, and preferably about 1.5 to about 2.5 mm. The foregoing cover thickness sufficient durability while not impairing a soft feel nor reducing the ball bounce resilience.

Examples of balls within a special shape are given below.

<Special 2-Piece Golf Ball>

A 2-piece golf ball has, for example, a spherical core and a cover thereover, the core being provided with grooves extending along three great circles encompassing the core so as to intersect each other at right angles, and projections being formed on the interior surface of the cover so as to corresponding engage with the corresponding grooves.

The grooves are preferably provided at a plurality of locations so as to achieve substantially a symmetry distribution around the center. The core can be molded with a molding assembly separable with a pair of molds. In the case, the surface of the grooves extends parallel to the direction in which the molds separate away from each other when releasing the core from the mold, or can extend in an outward radical direction from the separating direction as it comes closer to the separating line between the two molds.

Each of the grooves of the above-described 2-piece golf ball may be formed by excising in each sector, the arc section of which corresponds to the core surface, a portion of each of the bands that extend along three virtual great circles encompassing the core so as to intersect each other at right angles, each excised portion being above a plane that passes the top of the sector and is perpendicular to the normal line of the core passing through the intersection of the great circles.

<Special 3-Piece Golf Ball>

Embodiments of a 3-piece golf ball include those having a spherical main body as the core and a plurality of ribs formed on the surface of the main body. The intermediate layer is placed in the concave portions defined by the ribs. The ribs may be typically formed along three great circles encompassing the main body so as to intersect each other at right angles.

The ribs may be formed in various shapes. The ribs extend in such a manner that the width of the ribs becomes greater from the cover to the core, and preferably the concave portions therebetween are formed into cone-like shapes by the side surfaces of the ribs. Accordingly the ribs can be prevented from collapsing under pressures applied during molding operations because the width of the basal portions of the ribs is greater than the width of the outward ends of the ribs.

In the present invention, "cone-like shape" refers to a shape such that each concave portion forms a conical region by being surrounded by side surfaces of ribs, and the area of a plane formed by cutting the region along a spherical surface having the same center as the core becomes smaller as the cutting surface approaches the core from the center. The shape of the above-described conical plane is not limited and may be, e.g., polygonal as well as circular. In some embodiments, the concave portion is formed into a cone-like shape by being surrounded only by ribs, while in other embodiments, the main body is exposed at the bottom of the concave portion, and the side surfaces of the ribs and the main body together define the cone-like shape. However, even when the main body is exposed, the exposed area thereof is small and a cone-like shape is formed as a whole.

For example, each of the ribs may comprise at least one notch so as to form a passageway between adjacent concave portions. Forming a notch in the ribs can be advantageous as follows. For example, when press molding is conducted, the materials for the intermediate layer spread through the notches throughout the concave portions. This makes it unnecessary to separately fill the materials for the intermediate layer in each of the concave portions, simplifying the manufacturing facility and reducing the manufacturing time. When the intermediate layer is formed by injection molding, the intermediate layer can be formed by using one or a small number of gates.

It is preferable that each of the ribs extend along three great circles drawn around the main body so as to intersect each other at right angles, each arcuate section of the ribs being defined by the intersections of the great circles with a notch that has a surface plane that extends toward each arcuate section from one point on the normal line that passes through an intersection of the great circles and the core, wherein the surface plane has an angle that is not smaller than 90° relative to the normal line. Thereby four concave portions that are arranged so as to have their common center at an intersection of the great circles are made to communicate with each other, and the materials for the intermediate layer can readily spread between them. Because the angle made between the plane and the normal line is not smaller than 90°, the angle serves as a draft angle, and, for example, when the core is molded using two molds, such as an upper mold and a lower mold, the core can easily be removed from the mold.

From the viewpoint of making adjacent concave portions communicate with each other, it is possible to form a notch in the middle of each arcate section in the circular direction. It is preferable that the notch have two planes each of which extends toward an ajascent intersection from a point on the normal line of the main body that passes through the mid point of the arcuate section in the circular direction, wherein the angle made between the planes and the normal line is 45 to 48°. This arrangement allows the above angle made between the planes and the normal line to serve as a draft angle, so that the core can be removed from the mold easily.

The ribs have a height of about 0.5 to about 11.2 mm, and preferably about 1.8 to about 10.5 mm as measured from the surface of the main body. The thickness of the cover is the same as that of the ball with concentrically formed layers.

Special 4-Piece Golf Ball

Embodiments of the 4-piece golf ball as a multi-piece golf ball include those comprising a core, a first intermediate sub-layer, a second intermediate sub-layer and a cover, wherein the first intermediate layer has a plurality of ribs formed around the core, and the second intermediate layer is placed in the concave portions surrounded by the ribs, and the cover forms an outermost layer.

Each of the ribs extends in such a manner that the width of the ribs is greater as it approaches the core. Thereby the concave portions are preferably formed in a cone-like shape. In the present invention, "cone-like shape" refers to a shape such that each concave portion forms a conical region by being surrounded by side surfaces of ribs and the area of a plane formed by cutting the region along a spherical surface having the same center as the core becomes smaller as the cutting surface approaches the core from the cover. The shape of the above-described conical plane is not limited and may be, e.g., polygonal as well as circular. In some embodiments, the concave portion is formed into a cone-like shape by being surrounded only by ribs, while in other embodiments, the core is exposed at the bottom of the concave portion and the side surfaces of the rib and the core together define the cone-like shape. However, even when the core is exposed, the exposed area thereof is small and a cone-like shape is formed as a whole.

As within the 3-piece golf ball, in the 4-piece golf ball, each of the ribs preferably comprises a notch so as to form a passageway between adjacent concave portions. It is preferable that each of the ribs extend along three great circles drawn around the main body so as to intersect each other at right angles, each arcuate section of the ribs being defined by the intersections of the great circles with a notch that has a surface plane that extends toward each arcuate section from one point on the normal line that passes through an intersection of the great circles and the core, wherein the surface plane has an angle that is not smaller than 90° relative to the normal line.

The shape and size of concave portions and ribs are the same as in the above-mentioned embodiments of the 3-piece golf ball.

The core of the first ball in any shape has hardness of about 35 to about 60, and preferably about 40 to about 56, as measured in terms of JIS-D hardness (hardness measured by use of, as a tester, a type D durometer as prescribed in JIS K6253 (method of testing the hardness of vulcanized rubber and thermoplastic rubber)).

The intermediate layer has hardness of about 40 to about 70, and preferably about 42 to about 56, in terms of JIS-D hardness. The JIS-D hardness of the intermediate layer is measured by use of a type D durometer as prescribed in JIS K7215 (method of testing the durometer hardness of plastics) or by use of, as a tester, a type D durometer as prescribed in JIS K6253 (method of testing the hardness of vulcanized rubber and thermoplastic rubber). Although different reference numbers of JIS standards are employed, the measurement devices are of the same type, i.e. type D durometer, which means that the obtained hardness values are substantially identical.

The hardness of the cover is about 50 to about 75, and preferably about 55 to about 70, in terms of JIS-D hardness (hardness as measured by use of type D durometer, as a tester, prescribed in JIS K7215 (method of testing the durometer hardness of plastics)).

(ii) Second Ball

In the second ball, polyurethane is used as the cover base material in place of the ionomer resin used in the above-mentioned first ball. The preferred thickness and hardness of each layer are slightly different from those of the first ball, in other respects, the second ball is the same as the first ball.

The diameter of the core of a 2-piece golf ball with each layer concentrically formed is preferably about 40.8 to about 36.7 mm, and the thickness of the cover is preferably about 1 to about 2 mm.

In the embodiments of the 3-piece golf ball and 4-piece golf ball, the intermediate layer has an overall thickness of about 0.5 to about 4 mm, and preferably about 1 to about 2.5 mm, and the cover has a thickness of about 1 to about 3 mm, and preferably about 1 to about 2 mm. Insofar as the thickness of the cover is within the above-mentioned ranges, satisfactory durability is assured and a hard feel is scarcely perceived when hit.

In a 3-piece golf ball having a core provided with ribs and a 4-piece golf ball having a first intermediate sub-layer provided with ribs, the height of the ribs is preferably about 0.5 mm to about 11.2 mm.

The hardness of each intermediate sub-layer is about 40 to about 70, and preferably about 42 to about 56, in terms of JIS-D hardness. The hardness of the cover is about 40 to about 65, and preferably about 45 to about 60, in terms of JIS-D hardness.

Among the second balls containing polyurethane gel composite particles in a cover composed of polyurethane as the base material, preferable are a 2-piece golf ball containing butadiene rubber as the core base material; a 3-piece golf ball containing butadiene rubber as the core base material, and butadiene rubber, polyurethane or ionomer resin as the intermediate layer base material; and a 4-piece golf ball containing butadiene rubber as the core base material and as the base material for the first and second sub-layers, which may be the same or different, butadiene rubber, polyurethane or ionomer resin.

In the second ball having a cover composed of polyurethane gel composite particles and polyurethane as the base material, the intermediate layer is also preferably formed of polyurethane gel composite particles and ionomer resin base material.

In other respects, the second ball is the same as the first ball.

(iii) Third Ball

The third ball has an intermediate layer (one or more sub-layers in the case of intermediate sub-layers comprised of two layers) containing an ionomer resin as the base material and polyurethane gel composite particles.

The materials for the core are as described above in respect of the first multi-piece golf ball. The cover may be formed of a composition mainly comprising components known as materials for the cover of a multi-piece golf ball, such as ionomer resins, thermoplastic elastomers, diene-based block copolymers or mixtures thereof.

Ionomer resins and thermoplastic elastomers are as described above in the description of intermediate layers. Usable diene-based block copolymers are conjugated diene-based block copolymers having double bonds or partially hydrogenated block copolymers thereof, such as block copolymers of an aromatic vinyl compound with a conjugated diene-based compound and partially hydrogenated copolymer thereof. Useful aromatic vinyl compounds include, for example, styrene, α-methylstyrene, vinyltoluene, p-t-butyl styrene, 1,1-diphenylstyrene and the like. Useful conjugated diene-based compounds are, for instance, butadiene, isoprene, 1,3-pentadiene, 2,3-dimethyl-1,3-butadiene and the like. Aromatic vinyl compounds and conjugated diene compounds can be used singly or in combination.

Commercially available examples of diene-based block copolymer are "EPOFRIEND" series (products of DAICEL CHEMICAL INDUSTRIES, Ltd.), and "SEPTON" series (products of KURARAY CO., LTD.).

The base material preferably includes, for example, ionomer resins, thermoplastic elastomers (especially urethane-based elastomers) and/or mixtures thereof.

The cover may contain not only the base material but also known additives, for example, fillers, pigments, antioxidants, ultraviolet absorbers, dispersants, and plasticizers.

In the case of a 4-piece golf ball having two sub-layers as an intermediate layer, the sub-layer free of the polyurethane gel composite particles may be composed of the materials for the intermediate layer as explained above in respect of the first ball. Both these sub-layers may be formed of particles and ionomer resin.

Preferable Combinations of Materials for Layers

Preferable as the third ball having one intermediate layer formed of polyurethane gel composite particles are a ball containing butadiene rubber as the core base material and an ionomer resin or polyurethane as the cover base material (3-piece golf ball); and a ball containing butadiene rubber as the core base material, butadiene rubber, polyurethane or an ionomer resin as the base material for the other intermediate sub-layer, and an ionomer resin or polyurethane as the cover base material (4-piece golf ball). The polyurethane gel composite particles may be present also in this other intermediate layer.

In the third ball containing polyurethane gel composite particles and an ionomer resin in the intermediate layer, the cover may be formed of the particles and polyurethane base material.

Shape of the Layers

The thickness of the intermediate layer of a ball having layers concentrically formed may be about 1 to about 3 mm, and preferably about 1.5 to about 2.5 mm. Insofar as the thickness thereof is within the above mentioned ranges, satisfactory durability is obtainable without giving a hard feel when hit or reducing the ball bounce resilience. When the intermediate layer is composed of two sub-layers, the overall thickness of the intermediate layer is about 2 to about 6 mm. In this case, the thickness of the polyurethane gel composite particles-containing sub-layer is at least 1 mm, and preferably at least about 1.2 mm. The thickness of the cover is about 0.5 to about 2 mm, and preferably about 0.8 to about 2 mm.

In a 3-piece golf ball having a core provided with ribs and a 4-piece golf ball having a first intermediate sub-layer provided with ribs, the height of the ribs is about 0.5 mm to about 11.2 mm, and preferably about 1.8 to about 10.5 mm.

The hardness of the core is about 35 to about 60, and preferably about 40 to about 55, in terms of JIS-D hardness. The hardness of the intermediate layer is about 40 to about 70, and preferably about 42 to about 56, in terms of JIS-D hardness. The hardness of the cover is about 40 to about 70, and preferably about 50 to about 60, in terms of JIS-D hardness.

(iv) Fourth Ball

The fourth ball is such that polyurethane is used in place of the ionomer resin employed in the third ball as the base material for the intermediate layer (one or more sub-layers in the case of 2 intermediate sub-layers).

Among the fourth balls having one intermediate layer formed of polyurethane gel composite particles, preferable are a ball containing butadiene rubber as the core base material and an ionomer resin or polyurethane as the cover base material (3-piece golf ball); and a ball containing butadiene rubber as the core base material, butadiene rubber, polyurethane or an ionomer resin as the base material for the other intermediate layer, and an ionomer resin or polyurethane as the cover base material (4-piece golf ball). The polyurethane gel composite particles may be present in this other intermediate layer.

Among the fourth balls containing the polyurethane gel composite particles and polyurethane base material in the intermediate layer, a ball having a cover formed of the polyurethane gel composite particles and ionomer resin base material is preferred.

When composed of only one layer formed of the second composition, the thickness of the intermediate layer in this ball is about 1 to about 3 mm, and preferably about 1.2 to about 2 mm. Insofar as the thickness of the layer is within the above mentioned ranges, a soft feel is attained when hit without reducing the ball bounce resilience. When a 2-part intermediate layer is formed, the overall thickness of the intermediate layer is about 2 to about 6 mm. Of this overall thickness, the thickness of the layer containing the polyurethane gel composite particles may be at least 1 mm, and preferably at least 1.2 mm. The thickness of the cover is about 0.5 to about 2 mm, and preferably about 0.8 to about 2 mm.

In a 3-piece golf ball having a core provided with ribs and a 4-piece golf ball having a first intermediate sub-layer provided with ribs, the height of the ribs is about 0.5 mm to about 11 mm, and preferably about 1.8 to about 10.5 mm.

The hardness of the core is about 35 to about 60, in terms of JIS-D hardness. The hardness of each intermediate sub-layer is about 30 to about 70, and preferably about 40 to about 60, in terms of JIS-D hardness. The hardness of the cover is about 50 to about 75, and preferably about 55 to about 70, in terms of JIS-D hardness.

Other details are as described above with respect to the third ball.

(v) Fifth Ball

The fifth ball is such that butadiene rubber is used in place of polyurethane employed as the base material for the intermediate layer (one or more sub-layers in the case of 2 intermediate sub-layers) in the third ball.

Among the fifth balls having one intermediate layer formed of polyurethane gel composite particles, preferable are a ball containing butadiene rubber as the core base material, and an ionomer resin or polyurethane as the cover base material (3-piece golf ball); and a ball containing butadiene rubber as the core base material, butadiene rubber, polyurethane or an ionomer resin as the base material for the other intermediate layer, and an ionomer resin or polyurethane as the cover base material (4-piece golf ball). The polyurethane gel composite particles may be present in this other intermediate layer.

The thickness of the intermediate layer in such a ball is about 1 to about 3 mm, and preferably about 1.2 to about 2 mm, when composed of only one layer formed of the second composition. Insofar as the thickness of the layer is within these ranges, a soft feel is attained when hit without reducing the ball bounce resilience. When a 2-ply intermediate layer is formed, the overall thickness of the intermediate layer is about 2 to about 6 mm. Of the overall thickness, the thickness of the layer containing the polyurethane gel composite particles may be about 1 mm or more, and preferably about 1.2 mm or more. The thickness of the cover is usually about 0.5 to about 2 mm, and preferably about 0.8 to about 2 mm.

In a 3-piece golf ball having a core provided with ribs and a 4-piece golf ball having a first intermediate layer provided with ribs, the height of the ribs is ususally about 0.5 mm to about 11.2 mm, and preferably about 1.8 to about 10.5 mm.

The hardness of the core is about 35 to about 60, preferably about 40 to about 56, in terms of JIS-D hardness. The hardness of each intermediate sub-layer is about 40 to about 70, and preferably about 42 to about 56, in terms of JIS-D hardness. The hardness of the cover is about 45 to about 75, and preferably about 50 to about 65, in terms of JIS-D hardness.

Other particulars are as described above in respect of the third ball.

(vi) Sixth Ball

The sixth ball of the invention has a core formed of butadiene rubber as the base material and polyurethane gel composite particles. Preferable among such balls are a ball containing an ionomer resin or polyurethane as the cover base material (2-piece golf ball); a ball containing butadiene rubber, polyurethane or an ionomer resin as the intermediate layer base material, and an ionomer resin or polyurethane as the cover base material (3-piece golf ball); and a ball containing butadiene rubber, polyurethane, or ionomer resin as the base material for the first and second intermediate sub-layers which may be the same or different, and an ionomer resin or polyurethane as the cover base material (4-piece golf ball).

Referring to those with layers concentrically formed, a 2-piece golf ball which has a core of about 36.7 to about 40.8 mm in diameter, and preferably about 36 mm to about 40 mm, and a cover about 1 to 3 mm thickness, and preferably about 1 to about 2.5 mm.

A 3-piece golf ball or 4-piece golf ball has a core of about 29 to about 39 mm in diameter, an intermediate layer of about 0.5 to about 4 mm in overall thickness, and preferably about 1 to about 2.5 mm, and a cover of about 1 to 3 mm, and preferably about 1 to about 2.5 mm.

The height of the ribs in a ball having a core with ribs or a first intermediate layer with ribs is about 0.5 to about 11.2 mm, and preferably about 1.8 mm to 10.5 mm.

The hardness of the core is about 35 to about 60, and preferably about 40 to about 56, in terms of JIS-D hardness. The hardness of the intermediate layer is about 40 to about 70, and preferably about 42 to about 56, in terms of JIS-D hardness. The hardness of the cover is about 45 to about 75, and preferably about 50 to about 65, in terms of JIS-D hardness.

In molding a core, butadiene rubber and the particles are kneaded and then other components are added, followed by further kneading. In kneading, hitherto known mixers or rollers may be employed. The obtained mixture may be molded into a core, by for example, compression molding.

Other particulars are the same as in respect of the first ball.

EXAMPLES

The invention will be described in greater detail with reference to the following examples and test examples to which, however, the invention is not limited.

Polyurethane Gel Composite Particles

The polyurethane gel composite particles used in the following examples are: DAIMIC BEAZ UCN-5070D series (average particle size 7 μm, manufactured by Dainichiseika Color & Chemical Mfg. Co., Ltd.) formed of a thermosetting polyurethane resin. Table 1 shows the properties of these particles.

TABLE 1

|  | UCN-5070D | Measuring method |
| --- | --- | --- |
| Avg. particle size (μm) | 7 | Laser diffraction scattering type |
| True specific gravity | 1.20 | JIS K 6760 |
| Oil absorption (ml/100 g) | 48 | JIS K 5101 |
| Nonvolatile content (%) | 99 or more | Infrared moisture analyzer |
| Melting point (° C.) | 250 or more | Kofler Hot Bench |
| Hardness (JIS A) | 74 | JIS Type A |

In Table 1, the average particle size of the particles was measured in n-octane by use of a laser diffraction particle size analyzer (manufactured by NIKKISO Co., Ltd.: trade name Microtrack X-100). The non-volatile content was measured by use of an infrared moisture tester (manufactured by KETT ELECTRIC LABORATORY, Infrared Moisture Tester FD 230). The melting point was measured by Kofler Hot Bench (manufactured by Leica Co., Ltd., trade name Kofler Hot Bench).

The same effects are achieved by using the following particles as the polyurethane gel composite particles instead of the above-mentioned DAIMIC BEAZ UCN-5070 D series (average particle size 7 μm) DAIMIC BEAZ UCN-5150 D series (average particle size 15 μm), DAIMIC BEAZ UCN-5300 D series (average particle size 30 μm), DAIMIC BEAZ UCN-5020 D series (average particle size 2 μm), DAIMIC BEAZ UCN-5500 D series (average particle size 50 μm) and DAIMIC BEAZ UCN-5700 D series (average particle size 70 μm), all manufactured by Dainichiseika Color & Chemical Mfg. Co., Ltd.

Using DAIMIC BEAZ UCN-5070 D series, 3-piece golf balls with a layered intermediate layer and a layered cover concentrically formed over the surface of the spherical core were produced. Tables 2 to 7 show the composition, size and weight of each layer in the multi-piece golf balls.

In Tables 2 to 10, "+Δphr" means addition of Δ parts by weight of the polyurethane gel composite particles UCN-1070D per 100 parts by weight of the base material. "BR" means butadiene rubber used as the base material. "Ionomer" means an ionomer resin used as the base material. "PU" refers to thermosetting polyurethane used as the base material. "TPU" refers to thermoplastic polyurethane used. The formulation of each composition is described below. The size of the core in Table 2 refer to its diameter, and the sizes of the intermediate layer and the cover refer to their thicknesses.

In forming a layer of butadiene rubber containing the particles, the materials were kneaded by a roller and molded by compression molding. In forming a layer of thermoplastic resin (ionomer resin layer or thermoplastic polyurethane layer) containing the particles, the base material and the particles were kneaded by an extruder and molded. In forming a layer of thermosetting polyurethane containing the particles, the particles were added to the main materials and stirred, and the mixture was injection-molded.

TABLE 2

3-Piece golf ball with an ionomer cover containing fine particles

|  | Example 1-1 | Composition | Size (mm) | Weight (g) |
|---|---|---|---|---|
| Core | BR | Core A | 35.5 | 26.7 |
| Intermediate layer | BR | Intermediate layer A | 1.8 | 9.7 |
| Cover | Ionomer + 5 phr | Cover 1 | 1.8 | 9.2 |
| Ball |  |  | Dia. 42.7 | 45.6 |
|  | Example 1-2 | Composition | Size (mm) | Weight (g) |
| Core | BR | Core A | 35.5 | 26.7 |
| Intermediate layer | BR | Intermediate layer A | 1.8 | 9.7 |
| Cover | Ionomer + 10 phr | Cover 1 | 1.8 | 9.3 |
| Ball |  |  | Dia. 42.7 | 45.7 |
|  | Example 1-3 | Composition | Size (mm) | Weight (g) |
| Core | BR | Core A | 35.5 | 26.7 |
| Intermediate layer | BR | Intermediate layer A | 1.8 | 9.7 |
| Cover | Ionomer + 20 phr | Cover 1 | 1.8 | 9.5 |
| Ball |  |  | Dia. 42.7 | 45.9 |
|  | Comp. Example 1-1 | Composition | Size (mm) | Weight (g) |
| Core | BR | Core A | 35.5 | 26.7 |
| Intermediate layer | BR | Intermediate layer A | 1.8 | 9.7 |
| Cover | Ionomer | Cover 1 | 1.8 | 9.1 |
| Ball |  |  | Dia. 42.7 | 45.5 |

TABLE 2-continued

3-Piece golf ball with an ionomer cover containing fine particles

|  | Comp. Example 1-2 | Composition | Size (mm) | Weight (g) |
|---|---|---|---|---|
| Core | BR | Core B | 35.5 | 26.2 |
| Intermediate layer | BR | Intermediate layer A | 1.8 | 9.7 |
| Cover | Ionomer + 45 phr | Cover 1 | 1.8 | 9.7 |
| Ball |  |  | Dia. 42.7 | 45.6 |

Dia = diameter

Comp. = comparative

TABLE 3

3-Piece golf ball with a polyurethane cover containing particles

|  | Example 2-1 | Composition | Size (mm) | Weight (g) |
|---|---|---|---|---|
| Core | BR | Core A | 36.6 | 29.3 |
| Intermediate layer | Ionomer | Intermediate layer 1 | 1.8 | 8.0 |
| Cover | PU + 10 phr | Cover 2 | 1.3 | 8.1 |
| Ball |  |  | Dia. 42.8 | 45.4 |
|  | Comp. Example 2-1 | Composition | Size (mm) | Weight (g) |
| Core | BR | Core A | 36.6 | 29.3 |
| Intermediate layer | Ionomer | Intermediate layer 1 | 1.8 | 8.0 |
| Cover | PU | Cover 2 | 1.3 | 8.1 |
| Ball |  |  | Dia. 42.7 | 45.4 |
|  | Comp. Example 2-2 | Composition | Size (mm) | Weight (g) |
| Core | BR | Core B | 36.6 | 29.3 |
| Intermediate layer | Ionomer | Intermediate layer 1 | 1.8 | 8.0 |
| Cover | PU + 45 phr | Cover 2 | 1.3 | 8.2 |
| Ball |  |  | Dia. 42.8 | 45.5 |

TABLE 4

3-Piece golf ball with an ionomer intermediate layer containing particles

|  | Example 3-1 | Composition | Size (mm) | Weight (g) |
|---|---|---|---|---|
| Core | BR | Core A | 36.6 | 29.3 |
| Intermediate layer | Ionomer + 5 phr | Intermediate layer 1 | 1.8 | 8.1 |
| Cover | PU | Cover 2 | 1.3 | 8.1 |
| Ball |  |  | Dia. 42.8 | 45.5 |
|  | Example 3-2 | Composition | Size (mm) | Weight (g) |
| Core | BR | Core A | 36.6 | 29.3 |
| Intermediate layer | Ionomer + 5 phr | Intermediate layer 1 | 1.8 | 8.1 |
| Cover | PU + 5 phr | Cover 2 | 1.3 | 8.1 |
| Ball |  |  | Dia. 42.8 | 45.5 |
|  | Comp. Example 3-1 | Composition | Size (mm) | Weight (g) |
| Core | BR | Core A | 36.6 | 28.8 |
| Intermediate layer | Ionomer + 45 phr | Intermediate layer 1 | 1.8 | 8.6 |
| Cover | PU | Cover 2 | 1.3 | 8.1 |
| Ball |  |  | Dia. 42.8 | 45.4 |

TABLE 5

3-Piece golf ball with a thermoplastic polyurethane intermediate layer containing particles

|  | Example 4-1 | Composition | Size (mm) | Weight (g) |
| --- | --- | --- | --- | --- |
| Core | BR | Core A | 36.2 | 28.3 |
| Intermediate layer | TPU + 10 phr | Intermediate layer 2 | 1.5 | 7.6 |
| Cover | Ionomer | Cover 1 | 1.8 | 9.1 |
| Ball |  |  | Dia. 42.8 | 45.0 |
|  | Example 4-2 | Composition | Size (mm) | Weight (g) |
| Core | BR | Core A | 36.2 | 28.3 |
| Intermediate layer | TPU + 10 phr | Intermediate layer 2 | 1.5 | 7.6 |
| Cover | Ionomer + 2.5 phr | Cover 1 | 1.8 | 9.2 |
| Ball |  |  | Dia. 42.8 | 45.0 |
|  | Comp. Example 4-1 | Composition | Size (mm) | Weight (g) |
| Core | BR | Core A | 36.2 | 28.3 |
| Intermediate layer | TPU | Intermediate layer 2 | 1.5 | 7.6 |
| Cover | Ionomer | Cover 1 | 1.8 | 9.1 |
| Ball |  |  | Dia. 42.8 | 45.0 |
|  | Comp. Example 4-2 | Composition | Size (mm) | Weight (g) |
| Core | BR | Core A | 36.2 | 28.3 |
| Intermediate layer | TPU + 45 phr | Intermediate layer 1 | 1.5 | 7.8 |
| Cover | Ionomer | Cover 1 | 1.8 | 9.1 |
| Ball |  |  | Dia. 42.8 | 45.2 |

TABLE 6

3-Piece golf ball with a butadiene rubber intermediate layer containing particles

|  | Example 5-1 | Composition | Size (mm) | Weight (g) |
| --- | --- | --- | --- | --- |
| Core | BR | Core B | 36.2 | 27.8 |
| Intermediate layer | BR + 5 phr | Intermediate layer A | 1.8 | 10.1 |
| Cover | PU | Cover 2 | 1.5 | 7.7 |
| Ball |  |  | Dia. 42.8 | 45.6 |
|  | Example 5-2 | Composition | Size (mm) | Weight (g) |
| Core | BR | Core B | 36.2 | 27.8 |
| Intermediate layer | BR + 10 phr | Intermediate layer A | 1.8 | 10.1 |
| Cover | PU | Cover 2 | 1.5 | 7.7 |
| Ball |  |  | Dia. 42.8 | 45.6 |
|  | Comp. Example 5-1 | Composition | Size (mm) | Weight (g) |
| Core | BR | Core C | 36.2 | 26.3 |
| Intermediate layer | BR | Intermediate layer A | 1.8 | 10.1 |
| Cover | PU | Cover 2 | 1.5 | 9.2 |
| Ball |  |  | Dia. 42.8 | 45.6 |
|  | Comp. Example 5-2 | Composition | Size (mm) | Weight (g) |
| Core | BR | Core B | 36.2 | 26.3 |
| Intermediate layer | BR + 40 phr | Intermediate layer A | 1.8 | 10.0 |
| Cover | PU | Cover 2 | 1.5 | 9.2 |
| Ball |  |  | Dia. 42.8 | 45.5 |

TABLE 7

3-Piece golf ball with a butadiene rubber core containing particles

|  | Example 6-1 | Composition | Size (mm) | Weight (g) |
| --- | --- | --- | --- | --- |
| Core | BR + 2.5 phr | Core E | 36.2 | 28.8 |
| Intermediate layer | TPU | Intermediate layer 2 | 1.5 | 7.6 |
| Cover | Ionomer | Cover 1 | 1.8 | 9.1 |
| Ball |  |  | Dia. 42.8 | 45.5 |
|  | Comp. Example 6-1 | Composition | Size (mm) | Weight (g) |
| Core | BR + 40 phr | Core A | 36.2 | 28.8 |
| Intermediate layer | TPU | Intermediate layer 2 | 1.5 | 7.6 |
| Cover | Ionomer | Cover 1 | 1.8 | 9.1 |
| Ball |  |  | Dia. 42.8 | 45.5 |

Two-piece golf balls having a layered cover formed on the surface of the spheric core were produced in the same manner using the materials shown in Tables 8 to 10. The abbreviations in the tables are the same as described above.

TABLE 8

2-Piece golf ball with an ionomer cover containing particles

|  | Example 7-1 | Composition | Size (mm) | Weight (g) |
| --- | --- | --- | --- | --- |
| Core | BR | Core D | 39.0 | 36.0 |
| Cover | Ionomer + 5 phr | Cover 1 | 1.9 | 9.7 |
| Ball |  |  | Dia. 42.8 | 45.7 |
|  | Example 7-2 | Composition | Size (mm) | Weight (g) |
| Core | BR | Core D | 39.0 | 36.0 |
| Cover | Ionomer + 10 phr | Cover 1 | 1.9 | 9.8 |
| Ball |  |  | Dia. 42.8 | 45.8 |
|  | Example 7-3 | Composition | Size (mm) | Weight (g) |
| Core | BR | Core A | 39.0 | 35.4 |
| Cover | Ionomer + 20 phr | Cover 1 | 1.9 | 10.0 |
| Ball |  |  | Dia. 42.8 | 45.4 |
|  | Comp. Example 7-1 | Composition | Size (mm) | Weight (g) |
| Core | BR | Core E | 39.0 | 36.0 |
| Cover | Ionomer | Cover 1 | 1.9 | 9.6 |
| Ball |  |  | Dia. 42.8 | 45.6 |
|  | Comp. Example 7-2 | Composition | Size (mm) | Weight (g) |
| Core | BR | Core A | 39.0 | 35.4 |
| Cover | Ionomer + 45 phr | Cover 1 | 1.9 | 10.3 |
| Ball |  |  | Dia. 42.8 | 45.7 |

TABLE 9

2-Piece golf ball with a polyurethane cover containing particles

|  | Example 8-1 | Composition | Size (mm) | Weight (g) |
| --- | --- | --- | --- | --- |
| Core | BR | Core F | 40.2 | 37.4 |
| Cover | PU + 10 phr | Cover 2 | 1.3 | 8.1 |
| Ball |  |  | Dia. 42.8 | 45.5 |

TABLE 9-continued

2-Piece golf ball with a polyurethane cover containing particles

|  | Comp. Example 8-1 | Composition | Size (mm) | Weight (g) |
|---|---|---|---|---|
| Core | BR | Core F | 40.2 | 37.4 |
| Cover | PU | Cover 2 | 1.3 | 8.1 |
| Ball |  |  | Dia. 42.8 | 45.5 |
|  | Comp. Example 8-2 | Composition | Size (mm) | Weight (g) |
| Core | BR | Core F | 40.2 | 37.4 |
| Cover | PU + 45 phr | Cover 2 | 1.3 | 8.2 |
| Ball |  |  | Dia. 42.8 | 45.6 |

TABLE 10

2-Piece golf ball with a butadiene core containing particles

|  | Example 9-1 | Composition | Size (mm) | Weight (g) |
|---|---|---|---|---|
| Core | BR + 2.5 phr | Core E | 39.0 | 36.0 |
| Cover | Ionomer | Cover 1 | 1.9 | 9.6 |
| Ball |  |  | Dia. 42.8 | 45.6 |
|  | Comp. Example 9-1 | Composition | Size (mm) | Weight (g) |
| Core | BR + 40 phr | Core A | 39.0 | 34.2 |
| Cover | Ionomer | Cover 1 | 1.9 | 11.5 |
| Ball |  |  | Dia. 42.8 | 45.7 |

Hereafter, embodiments for the production of multi-piece golf balls of a special shape using DAIMIC BEAZ UCN-5070 D series are described.

Figure 3:
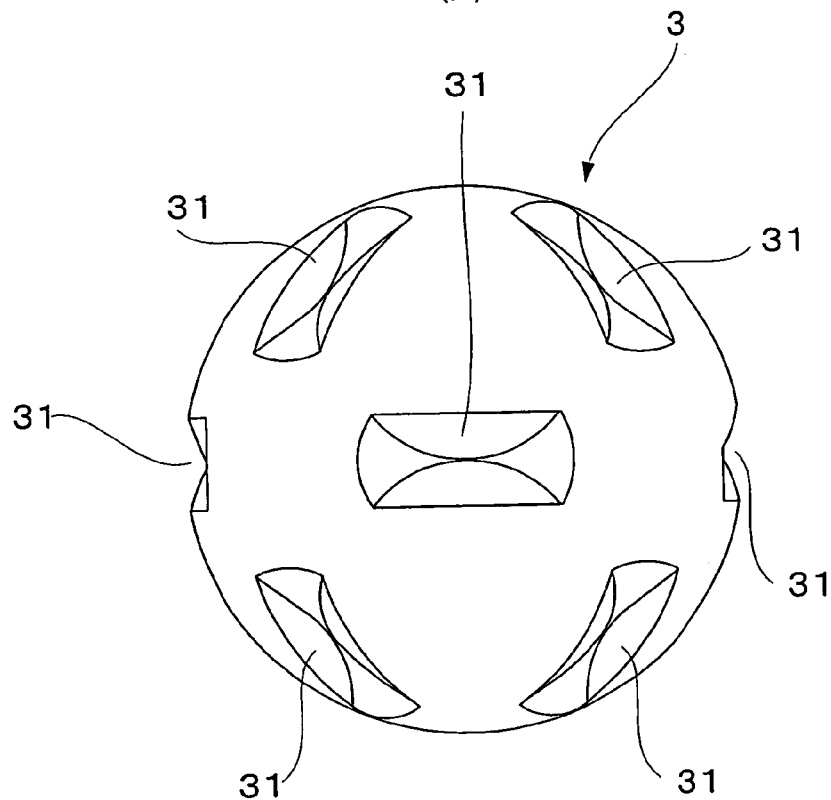
FIG. 3 shows the structure of the core of a 2-piece golf ball according to one embodiment of the invention. Fig. (A) depicts the core and Fig. (B) shows the interior surface side of the cover.
Figure 3:
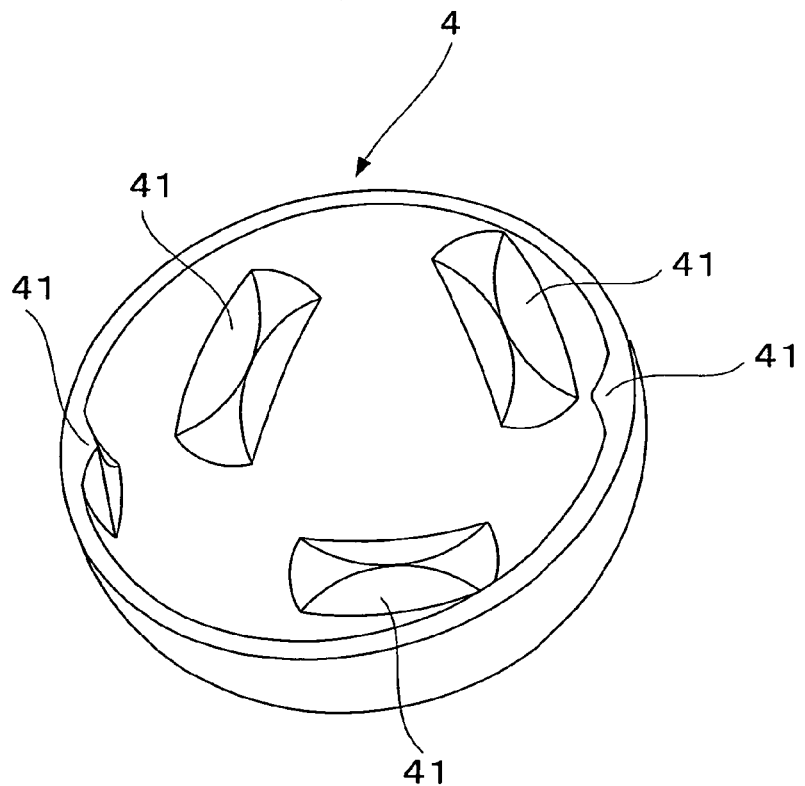

A 2-piece golf ball was produced using the materials shown in Table 11. The shapes of the core and cover of the 2-piece golf ball thus produced are shown in FIG. 3. Fig. (A) illustrates the core and Fig. (B) indicates the interior surface side of the cover. The core 3 is spherical. Projections 41 formed on the interior surface of the cover 4 are engageable with grooves 31 formed on the surface of the core. The maximum depth of the grooves is 2.5 mm.

TABLE 11

2-Piece golf ball with a cover containing particles and with grooves formed on the core

|  | Example 10-1 | Composition | Size (mm) | Weight (g) |
|---|---|---|---|---|
| Core | BR | Core H | 39.0 | 35.6 |
| Cover | Ionomer + 5 phr | Cover 1 | 1.9 | 9.7 |
| Ball |  |  | Dia. 42.8 | 45.3 |

Figure 4:
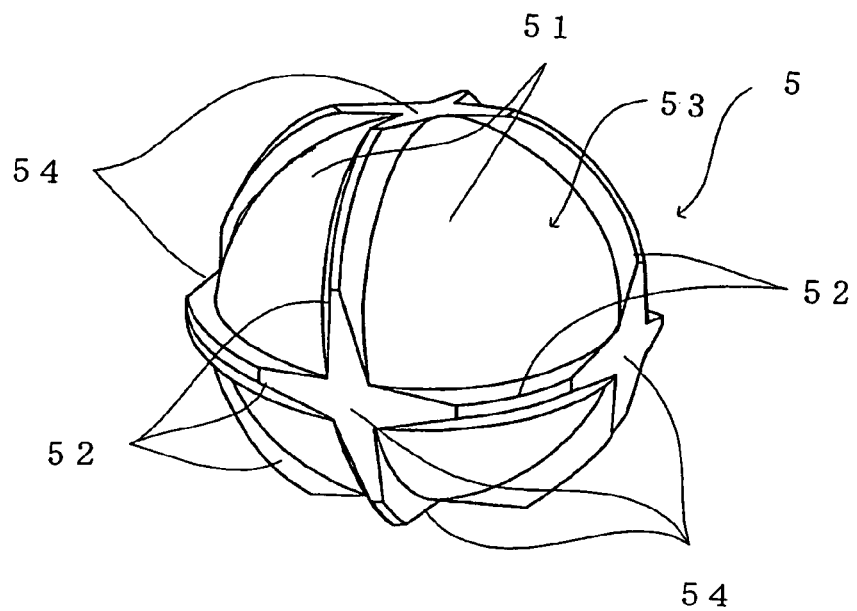
FIG. 4 shows the structure of the core and the intermediate layer of a 3-piece golf ball according to another embodiment of the invention.

A 3-piece golf ball was produced by use of the materials shown in Table 12. The shape of the core of the 3-piece golf ball is shown in FIG. 4. The core 5 comprises a spherical main body 51 and three ribs 52 integrally formed on the surface of the core 5. Each of the ribs 52 extends along three great circles encompassing the surface of the main body 51 so as to intersect each other at right angles. Eight concave portions 53 are defined on the surface of the main body 51 by the ribs 52. An intermediate layer (not shown) is placed in the concave portions 53, and notches 54 are formed at the intersections of the ribs 52. The surface thereover is covered with a cover (not shown).

TABLE 12

3-Piece golf ball having an intermediate layer with ribs and having a cover containing the particles

|  | Example 11-1 | Composition | Size (mm) | Weight (g) |
|---|---|---|---|---|
| Core | BR | Core A | Dai. 34.9 | 27.6 |
| Intermediate layer | BR | Intermediate Layer (A) | 2.0 | 8.5 |
| Cover | Ionomer + 5 phr | Cover 1 | 1.9 | 9.6 |
| Ball |  |  | Dia. 42.8 | 45.7 |

The size (diameter) of 34.9 mm of the core is the size of the spherical outer outline of the core and does not include the height of the ribs.

Figure 5:
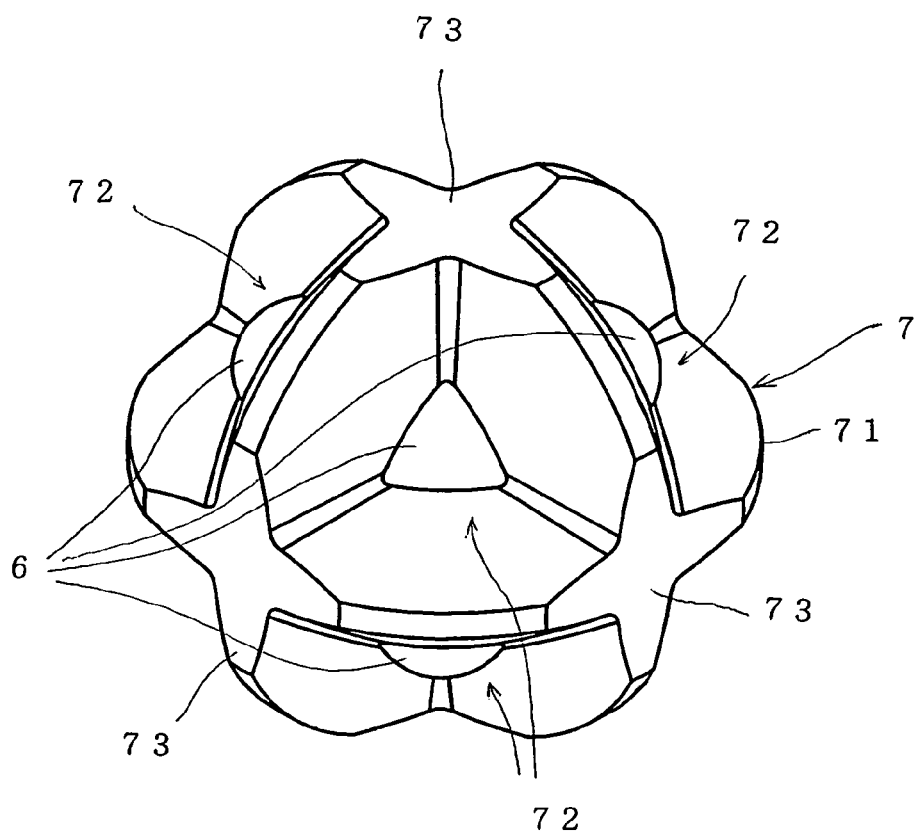
FIG. 5 shows the structure of the core and the first intermediate layer of a 4-piece golf ball according to another embodiment of the invention.

Four-piece golf balls were produced using the materials shown in Table 13. The shape defined by a combination of the core of the 4-piece golf ball with the first intermediate sub-layer is illustrated in FIG. 5. The first intermediate layer 7 is formed of three ribs 71 extending so as to intersect each other at right angles around the surface of the core 6. Specifically, each of the ribs 71 extends along three great circles encompassing the core 6 so as to intersect each other at right angles. Eight concave portions 72 are defined on the surface of the core 6 by the ribs 71. The ribs 71 trapezoidal in cross-section so that the width thereof becomes greater as the rib 71 extends to the surface of the core 6. Because of this shape of the ribs 71, the concave portions 72 form a trigonal pyramid-like shape surrounded by three ribs 71 and the surface of the core 6 that is slightly exposed. The ribs 71 have notchs 73 at the intersections of the three circles. A second intermediate sub-layer (not shown) is placed in the concave portions 72 and a cover (not shown) is formed thereover.

TABLE 13

4-Piece golf ball having a cover containing particles and having first and second intermediate layers

|  | Example 12-1 | Composition | Size (mm) | Weight (g) |
|---|---|---|---|---|
| Core | BR | Core G | Dia. 23.1 | 7.4 |
| 1st intermediate layer | BR | Core E | Height 8.0 | 15.5 |
| 2nd intermediate layer | BR | Intermediate Layer B | Height 8.0 | 13.3 |
| Cover | Ionomer + 5 phr | Cover 1 | Thickness 1.8 | 9.1 |
| Ball |  |  | Dia. 42.7 | 45.3 |

Tables 14 to 16 show the formulations of the butadiene rubber compositions indicated in Tables 2 to 13. The crosslinking initiators shown in Table 11 include Percumyl D and Perhexa 3M (both manufactured by NOF CORPO- RATION), and Tolygonocks 29A (manufactured by Kayaku Akuzo Co., Ltd.). The antioxidants include Nocrac NS-6 (manufactured by Ohuchi Shinko Kagaku Kogyo Co., Ltd.), and Volkanox BKF (manufactured by Bayer Co., Ltd.). The butadiene rubber is high cis polybutadiene rubber.

TABLE 14

| BR used | Core A | Core A (2.5) | Core A (40) | Core B | Core C | Core D |
|---|---|---|---|---|---|---|
| BR | 100 | 100 | 100 | 100 | 100 | 100 |
| UCN-5070D | | 2.5 | 40 | | | |
| Zinc oxide | 5 | 5 | 5 | 5 | 5 | 5 |
| Barium sulfate | 12 | 12 | 12 | 9 | 0 | 28 |
| Crosslinking initiator | 2 | 2 | 2 | 2 | 2 | 2 |
| Zinc acrylate | 24 | 24 | 24 | 24 | 24 | 24 |
| Magnesium carbonate | 2 | 2 | 2 | 2 | 1 | 2 |
| Antioxidant | 0.1 | 0.1 | 0.1 | 0.1 | 0.1 | 0.1 |
| Specific gravity | 1.14 | 1.14 | 1.16 | 1.12 | 1.06 | 1.23 |
| Hardness | 54 | 53 | 50 | 54 | 54 | 54 |

TABLE 15

| BR used | Core E | Core E (2.5) | Core F | Core G | Core H |
|---|---|---|---|---|---|
| BR | 100 | 100 | 100 | 100 | 100 |
| UCN-5070D | | 2.5 | | | |
| Zinc oxide | 5 | 5 | 5 | 5 | 5 |
| Barium sulfate | 15 | 15 | 1.5 | 19 | 17 |
| Crosslinking initiator | 2 | 2 | 2 | 2 | 2 |
| Zinc acrylate | 24 | 24 | 24 | 12 | 21 |
| Magnesium carbonate | 2 | 2 | 2 | 2 | 2 |
| Antioxidant | 0.1 | 0.1 | 0.1 | 0.1 | 0.1 |

TABLE 15-continued

| BR used | Core E | Core E (2.5) | Core F | Core G | Core H |
|---|---|---|---|---|---|
| Specific gravity | 1.16 | 1.16 | 1.16 | 1.14 | 1.15 |
| Hardness | 54 | 53 | 54 | 40 | 50 |

TABLE 16

| BR used | Intermediate layer A | Intermediate Layer A (5) | Intermediate layer A (10) | Intermediate layer A (40) | Intermediate layer B |
|---|---|---|---|---|---|
| BR | 100 | 100 | 100 | 100 | 100 |
| UCN-5070D | | 5 | 10 | 40 | |
| Zinc oxide | 5 | 5 | 5 | 5 | 5 |
| Barium sulfate | 31 | 31 | 31 | 31 | 20 |
| Crosslinking initiator | 2 | 2 | 2 | 2 | 2 |
| Zinc acrylate | 17 | 17 | 17 | 17 | 17 |
| Magnesium carbonate | 2 | 2 | 2 | 2 | 2 |
| Antioxidant | 0.1 | 0.1 | 0.1 | 0.1 | 0.1 |
| Specific gravity | 1.23 | 1.23 | 1.23 | 1.22 | 1.16 |
| Hardness | 46 | 46 | 46 | 46 | 46 |

Tables 17 and 18 show the formulations of the ionomer compositions, thermosetting polyurethane compositions and thermoplastic polyurethane elastomer compositions shown in Tables 2 to 13. In Tables 17 and 18, Himilan series refers to ionomer resins manufactured by Dupont Mitsui Chemical Co., Ltd. ADIPRENE LF950 is a thermosetting polyurethane manufactured by Uniroyal Chemical Co., Inc., and LONZA-CURE is a curing agent manufactured by Uniroyal Chemical Co., Ltd. Elastolan 1190A is a thermoplastic polyurethane elastomer manufactured by BASF Japan Co., Ltd.

TABLE 17

| | Inclusion of cover composition | | | | | | | |
|---|---|---|---|---|---|---|---|---|
| | Cover 1 | Cover 1 (15 phr) | Cover 1 (10 phr) | Cover 1 (20 phr) | Cover 1 (45 phr) | Cover 2 | Cover 2 (5 phr) | Cover 2 (10 phr) | Cover 2 (45 phr) |
| UCN-5070D | | 5 | 10 | 20 | 45 | | 5 | 10 | 45 |
| Himilan 1605(61)0.94 | 50 | 50 | 50 | 50 | 50 | | | | |
| Himilan 1706(60)0.96 | 50 | 50 | 50 | 50 | 50 | | | | |
| Himilan 1855(54)0.96 | | | | | | | | | |
| Himilan 1856(52)0.95 | | | | | | | | | |
| Asiplane LF950 | | | | | | 100 | 100 | 100 | 100 |
| Ronzacure M-CDEA | | | | | | 26.1 | 26.1 | 26.1 | 26.1 |
| Elastran 1190A | | | | | | | | | |

| | Inclusion of intermediate layer composition | | | | | |
|---|---|---|---|---|---|---|
| | Intermediate layer ① | Intermediate layer ① (5 phr) | Intermediate layer ① (45 phr) | Intermediate layer ② | Intermediate layer ② (5 phr) | Intermediate layer ② (45 phr) |
| UCN-5070D | | 5 | 45 | | 5 | 45 |
| Himilan 1605(61) 0.94 | 20 | 20 | 20 | | | |
| Himilan 1706(60) 0.96 | 20 | 20 | 20 | | | |
| Himilan 1855(54) 0.96 | 30 | 30 | 30 | | | |
| Himilan 1856(52) 0.95 | 30 | 30 | 30 | | | |
| Asiplane LF950 | | | | | | |
| Ronsacure M-CDEA | | | | | | |
| Elastran 1190A | | | | 100 | 100 | 100 |

<Carry Test>

Using the golf balls produced in the examples and comparative examples, hitting tests were conducted by a hitting robot (manufactured by Miyamae Co., Ltd., trade name "SHOT ROBO V") with a driver (a number one wood manufactured by Mizuno Corporation, trade name MP-001, method; loft angle 9.5°, shaft length 45 inches (114.3 cm), fitted with Tour Spirit MP carbon shaft, shaft hardness S) and set at a head speed of 45 m/sec to measure the carry (distance the ball travels before reaching the ground). The tests for carry distance and speed of backspin were performed for 5 balls on each example to obtain average values.

<Feeling>

Ten top amateur golfers were allowed to hit the golf balls produced in the examples and comparative examples using a number one wood and a number five iron. The feeling was evaluated at 5 grades by the ten golfers and calculated to give an average value (1. soft, 2: somewhat soft, 3: neither soft nor hard, 4: somewhat hard; 5: hard).

<Durability Test>

Using the golf balls produced in the examples and comparative examples, balls were fired from an air gun and repeatedly allowed to impact at a speed of 40 m/sec against a plate of iron 2.5 m from the forward end of the gun to determine the mumber of discharges until cracks on the surface of the ball and/or a deformation due to separation of layers could be observed. Three balls were used for each test to acquire an average value. The results are expressed as follows.

A: 300 or more times
B: 200 to 299 times
C: 150 to 199 times
D: 100 to 149 times
E: 99 or less times <Coating Test>

The same area of golf balls produced in the examples and comparative examples was hit repeatedly 10 times by a hitting robot (manufactured by Miyamae Co., Ltd., trade name "SHOT ROBO V") fitted with a short iron (manufactured by Mizuno Corporation, T-ZOID COMP PLUS 7I (number seven iron), loft angle of 33°, shaft: T-ZOID original carbon shaft, hardness SR), set at a head speed of 36 m/sec. The impact area of the ball was observed to determine the coating damage. The degree of damage was evaluated over 4 grades.

A: Separation and cracking of the coating was scarcely bisible.
B: A slight degree of coating cracksing was found.
C: Separation and/or cracking of the coating was clearly visible.
D: Separation and/or cracking of the coating was brought about by a single hit.

The results of the above-described test are listed in Tables 19 and 20. Table 19 shows the results of plain 3-piece golf balls comprising a spherical core, a layered intermediate layer and a cover. Table 20 shows the results of plain 2-piece golf balls comprising a spherical core and a cover, and the results of multi-piece golf balls with a special shape (2-piece golf balls having a core with grooves, 3-piece golf balls having a core with ribs, and 4-piece golf balls comprising a core, first intermediate layer with ribs, a second intermediate layer, and a cover.

TABLE 19

| | 3P | | | | | |
|---|---|---|---|---|---|---|
| | Ex. 1-1 | Ex. 2-1 | Ex. 3-1 | Ex. 4-1 | Ex. 5-1 | Ex. 6-1 |
| Core | BR | BR | BR | BR | BR | BR + 2.5 phr |
| Intermediate layer | BR | Ionomer | Ionomer + 5 phr | TPU + 10 phr | BR + 5 phr | TPU |
| Cover | Ionomer + 5 phr | PU + 10 phr | PU | Ionomer | PU | Ionomer |
| Carry distance | 203.1 | 196.2 | 196.6 | 197.9 | 197 | 197.4 |
| Feel | 2.7 | 2.6 | 2.6 | 2.6 | 2.4 | 3 |
| Durability | B | B | B | B | B | B |
| Coating | A | A | B | B | B | B |

| | Ex. 1-2 | Ex. 3-2 | Ex. 4-2 | Ex. 5-2 | Ex. 1-3 |
|---|---|---|---|---|---|
| Core | BR | BR | BR | BR | BR |
| Intermediate layer | BR | Ionomer + 5 phr | TPU + 10 phr | BR + 10 phr | BR |
| Cover | Ionomer + 10 phr | PU + 5 phr | Ionomer + 2.5 phr | PU | Ionomer + 20 phr |
| Carry distance | 202.9 | 199.3 | 199.7 | 196.3 | 201.8 |
| Feel | 2.5 | 2.4 | 2.5 | 2.3 | 2.4 |
| Durability | B | A | A | A | B |
| Coating | A | A | A | B | A |

TABLE 19-continued

|  | C. Ex. 1-1 | C. Ex. 2-1 | C. Ex. 3-1 | C. Ex. 4-1 | C. 5-1 | C. Ex. 6-1 |
|---|---|---|---|---|---|---|
| Core | BR | BR | BR | BR | BR | BR + 40 phr |
| Intermediate layer | BR | Ionomer | Ionomer + 45 phr | TPU | BR | TPU |
| Cover | Ionomer | PU | PU | Ionomer | PU | Ionomer |
| Carry distance | 200.2 | 192.9 | 192.6 | 194.6 | 193.6 | 191.3 |
| Feel | 4.3 | 2.85 | 2 | 3.1 | 2.7 | 2 |
| Durability | B | B | D | C | B | C |
| Coating | D | B | B | D | B | D |

|  |  | C. Ex. 1-2 | C. Ex. 2-2 | C. Ex. 4-2 | C. Ex. 5-2 |
|---|---|---|---|---|---|
| | Core | BR | BR | BR | BR |
| | Intermediate layer | BR | Ionomer | TPU + 45 phr | BR + 40 phr |
| | Cover | Ionomer + 45 phr | PU + 45 phr | Ionomer | PU |
| | Carry distance | 192.2 | 191 | 191.9 | 190.1 |
| | Feel | 1.7 | 1.6 | 1.9 | 1.8 |
| | Durability | E | E | D | C |
| | Coating | D | C | C | B |

(C. stands for comparative)

TABLE 20

|  | 2p | | | 2p* | 3p* | 4p* | | |
|---|---|---|---|---|---|---|---|---|
|  | Ex. 7-1 | Ex. 8-1 | Ex. 9-1 | Ex. 10-1 | Ex. 11-1 | Ex. 12-1 | Ex. 7-2 | Ex. 7-3 |
| Core | BR | BR | BR + 2.5 phr | BR | BR | BR | BR | BR |
| Intermediate layer |  |  | Ionomer |  | BR | BR/BR |  |  |
| Cover | Ionomer + 5 phr | PU + 10 phr (1.15) |  | Ionomer + 5 phr | Ionomer + 5 phr | Ionomer + 5 phr | Ionomer + 10 phr | Ionomer + 20 phr |
| Carry distance | 203.2 | 198.5 | 201.2 | 204.6 | 204.1 | 203.8 | 202.2 | 201.3 |
| Feel | 2.8 | 2.4 | 3.4 | 2.9 | 2.7 | 2.5 | 2.6 | 2.5 |
| Durability | B | B | B | B | B | B | B | B |
| Coating | A | A | B | A | A | A | A | A |

|  |  | Comp. Ex. 7-1 | Comp. Ex. 8-1 | Comp. Ex. 9-1 | Comp. Ex. 7-2 | Comp. Ex. 8-2 |
|---|---|---|---|---|---|---|
| | Core | BR | BR | BR + 40 phr | BR | BR |
| | Intermediate layer |  |  |  |  |  |
| | Cover | Ionomer | PU | Ionomer | Ionomer + 45 phr | PU + 45 phr |
| | Carry distance | 203.3 | 194.9 | 194.3 | 194.5 | 192.6 |
| | Feeling | 4.4 | 2.9 | 3.1 | 1.8 | 1.5 |
| | Durability | B | B | D | E | E |
| | Coating | D | B | D | D | C |

In Table 20, 2p* indicates 2-piece golf ball having a core with grooves; 3p* indicates 3-piece golf ball having a core with ribs; and 4p* indicates 4-piece golf ball having a first intermediate layer with ribs.

As is apparent from Tables 19 and 20, balls produced according to embodiments of the invention were able both to achieve a long carry distance and to give a soft feel when hit. These balls had excellent durability and coating strength. In contrast, those balls not including the polyurethane gel composite particles gave a hard feel when hit. Furthermore, when the balls contain an excessive amount of polyurethane gel composite particles, this results in a shortened carry distance and low durability.

Balls with an ionomer cover without the polyurethane gel composite particles exhibited a relatively low coating strength, whereas balls containing the polyurethane gel composite particles produced according to the invention had a superior coating strength.

The invention claimed is:

1. A multi-piece golf ball comprising a core, an intermediate layer formed of one or two sub-layers, and a cover, or comprising a core and a cover, wherein the cover is a layer formed of a composition consisting of polyurethane gel composite particles and at least one base material consisting of ionomer resin, polyurethane and butadiene rubber, the polyurethane gel composite particles consisting of colloidal polyurea particles precipitated from a non-aqueous solvent solution of colloidal polyurea and polyurethane gel particles covered with the polyurea particles, the polyurethane gel particles being three-dimensionally crosslinked and each of the polyurethane gel particles being formed of a polyisocyanate compound and a polyethylene oxide group-free, active-hydrogen-containing compound, at least one of the compounds being trifunctional or higher valency, and wherein the polyurethane gel composite particles are present in an amount of from 0.1 to 40 parts by weight per 100 parts by weight of the base material when the base material is ionomer resin or polyurethane, and the polyurethane gel composite particles are present in an amount of from 0.1 to 30 parts by weight per 100 parts by weight of the base material when the base material is butadiene rubber.

2. The multi-piece golf ball according to claim 1, wherein the base material for the core is butadiene rubber, and wherein the base material for the intermediate layer, if present, is butadiene rubber, polyurethane or ionomer resin.

3. The multi-piece golf ball according to claim 1, wherein each of the colloidal polyurea particles composing the polyurethane gel composite particles comprises a solvated portion and a non-solvated portion, the non-solvated portion having a particle size of from 0.01 to 1 μm.

4. The multi-piece golf ball according to claim 3, wherein each of the colloidal polyurea particles composing the polyurethane gel composite particles are obtained by reacting an oil-modified polyol and a polyisocyanate and then reacting the resulting reaction product with a polyamine compound, each polyurea particles having a non-solvated portion which forms a hydrogen bonds with urea groups.

5. The multi-piece golf ball according to claim 4, wherein each of the colloidal polyurea particles composing the polyurethane gel composite particles has a non-solvated portion further formed by bonding at least one functional group selected from the group consisting of hydroxyl, carboxyl and mercapto groups.

6. The multi-piece golf ball according to claim 1, wherein the polyurethane gel composite particles have a particle size of 0.5 to 100 μm.

7. The multi-piece golfball according to claim 3, wherein the base material for the core is butadiene rubber, and wherein the base material for the intermediate layer, if present, is butadiene rubber, polyurethane or ionomer resin.

* * * * *